(12) United States Patent
Tomoda

(10) Patent No.: US 12,406,259 B2
(45) Date of Patent: Sep. 2, 2025

(54) FRAUD DETECTION SYSTEM, FRAUD DETECTION METHOD AND PROGRAM

(71) Applicant: RAKUTEN GROUP, INC., Tokyo (JP)

(72) Inventor: Kyosuke Tomoda, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 318 days.

(21) Appl. No.: 17/418,862

(22) PCT Filed: Sep. 29, 2020

(86) PCT No.: PCT/JP2020/037003
§ 371 (c)(1),
(2) Date: Jun. 28, 2021

(87) PCT Pub. No.: WO2022/070277
PCT Pub. Date: Apr. 7, 2022

(65) Prior Publication Data
US 2022/0309510 A1    Sep. 29, 2022

(51) Int. Cl.
*G06Q 20/40*  (2012.01)
*G06N 20/00*  (2019.01)

(52) U.S. Cl.
CPC ......... *G06Q 20/4016* (2013.01); *G06N 20/00* (2019.01)

(58) Field of Classification Search
None
See application file for complete search history.

(56) References Cited

U.S. PATENT DOCUMENTS 9,031,877 B1 * 5/2015 Santhana ............. G06Q 20/401 705/50
9,135,467 B2 * 9/2015 Mishra ................. H04L 63/102
(Continued)

FOREIGN PATENT DOCUMENTS

JP    2003-248661 A    9/2003
JP    2006-260201 A    9/2006
(Continued)

OTHER PUBLICATIONS

J.-M. Liu, J. Tian, Z.-X. Cai, Y. Zhou, R.-H. Luo and R.-R. Wang, "A hybrid semi-supervised approach for financial fraud detection," 2017 International Conference on Machine Learning and Cybernetics (ICMLC), Ningbo, China, 2017, pp. 217-222 (Year: 2017).*

(Continued)

*Primary Examiner* — Mohammad Z Shaikh
(74) *Attorney, Agent, or Firm* — HEA Law PLLC

(57) ABSTRACT

A fraud detection system includes at least one processor configured to acquire, based on an action performed by each of a plurality of users, a score relating to a fraud level of the user, determine, based on the score of each of the plurality of users, an acquisition method for a feature amount of the user such that an acquisition time of the feature amount becomes shorter as the fraud level becomes lower, acquire the feature amount of each of the plurality of users based on the acquisition method determined for the user, and detect fraud made by each of the plurality of users based on the feature amount of the user.

10 Claims, 12 Drawing Sheets

DB2

| TYPE OF FEATURE AMOUNT | FEATURE AMOUNT SERVER | ACQUISITION TIME |
|---|---|---|
| FEATURE AMOUNT1 | 20-1 | 40ms |
| FEATURE AMOUNT2 | 20-2 | 30ms |
| FEATURE AMOUNT3 | 20-3 | 200ms |
| FEATURE AMOUNT4 | 20-4 | 50ms |
| . | . | . |
| . | . | . |
| . | . | . |

(56) References Cited

U.S. PATENT DOCUMENTS

| | | | |
|---|---|---|---|
| 10,204,374 B1* | 2/2019 | Holan | G06Q 30/0637 |
| 10,825,028 B1* | 11/2020 | Kramme | G06Q 20/24 |
| 11,062,315 B2* | 7/2021 | Noble | G06Q 30/06 |
| 11,151,569 B2* | 10/2021 | Allbright | G06N 20/10 |
| 11,570,195 B2* | 1/2023 | Madhu | H04W 4/21 |
| 11,580,339 B2* | 2/2023 | Warrick, II | G06F 18/24323 |
| 11,722,459 B1* | 8/2023 | Hall | H04L 63/083 |
| | | | 726/11 |
| 11,741,374 B1* | 8/2023 | Difranco | G06N 3/09 |
| | | | 706/45 |
| 2005/0076230 A1* | 4/2005 | Redenbaugh | H04L 63/168 |
| | | | 726/26 |
| 2007/0133768 A1* | 6/2007 | Singh | H04M 15/00 |
| | | | 379/114.14 |
| 2007/0192484 A1 | 8/2007 | Yamaoka et al. | |
| 2010/0185534 A1* | 7/2010 | Satyavolu | H04M 15/8044 |
| | | | 705/30 |
| 2011/0055074 A1* | 3/2011 | Chen | G06Q 20/405 |
| | | | 705/39 |
| 2011/0191200 A1* | 8/2011 | Bayer | G06Q 20/12 |
| | | | 705/26.1 |
| 2011/0270752 A1* | 11/2011 | Neto | G06Q 20/40 |
| | | | 705/44 |
| 2012/0158540 A1* | 6/2012 | Ganti | G06Q 30/0185 |
| | | | 705/26.35 |
| 2013/0024375 A1 | 1/2013 | Choudhuri et al. | |
| 2013/0133258 A1* | 5/2013 | Carter | B32B 5/26 |
| | | | 47/59 S |
| 2015/0039513 A1* | 2/2015 | Adjaoute | G06Q 30/0609 |
| | | | 705/44 |
| 2015/0238672 A1* | 8/2015 | Barrett | G01N 33/721 |
| | | | 356/40 |
| 2016/0005029 A1* | 1/2016 | Ivey | G06Q 20/4016 |
| | | | 705/44 |
| 2017/0235792 A1* | 8/2017 | Mawji | G06F 16/9035 |
| | | | 707/769 |
| 2017/0270529 A1* | 9/2017 | Ebel | G06F 16/24568 |
| 2017/0330175 A1* | 11/2017 | Bayer | G06F 21/121 |
| 2018/0218261 A1* | 8/2018 | Myara | G06N 3/045 |
| 2018/0253728 A1* | 9/2018 | Hanis | G06Q 20/4016 |
| 2018/0365696 A1* | 12/2018 | Yan | G06F 18/2321 |
| 2019/0065596 A1* | 2/2019 | Meron | G06Q 20/10 |
| 2019/0095608 A1* | 3/2019 | Kohli | G06Q 20/405 |
| 2019/0188799 A1* | 6/2019 | Kumar | G06Q 40/08 |
| 2019/0259037 A1 | 8/2019 | Kimura | |
| 2019/0295088 A1* | 9/2019 | Jia | G06N 5/04 |
| 2020/0007564 A1* | 1/2020 | Xie | G06Q 20/12 |
| 2020/0118136 A1* | 4/2020 | Zhang | G06Q 20/405 |
| 2020/0272849 A1 | 8/2020 | Tomoda | |
| 2020/0364718 A1* | 11/2020 | Hindi | G06Q 20/4016 |
| 2021/0012346 A1* | 1/2021 | Walters | G06F 16/9024 |
| 2021/0042757 A1* | 2/2021 | Hearty | G06F 21/577 |
| 2021/0312455 A1* | 10/2021 | Venturelli | G06Q 20/34 |
| 2022/0172213 A1* | 6/2022 | Hearty | G06Q 20/0855 |

FOREIGN PATENT DOCUMENTS

| | | |
|---|---|---|
| WO | 2010/044288 A1 | 4/2010 |
| WO | 2019/049210 A1 | 3/2019 |

OTHER PUBLICATIONS

E. Caldeira, G. Brandao and A. C. M. Pereira, "Fraud Analysis and Prevention in e-Commerce Transactions," 2014 9th Latin American Web Congress, Minas Gerais, Brazil, 2014, pp. 42-49. (Year: 2014).*

Microsoft Computer Dictionary, Fifth Edition, Microsoft Press, 2002, p. 281. (Year: 2002).*

N. Rtayli and N. Enneya, "Credit Card Risk Detection based on Feature-Filter and Fraud Identification," 2019 Third International Conference on Intelligent Computing in Data Sciences (ICDS), Marrakech, Morocco, 2019, pp. 1-8. (Year: 2019).*

Search Report of Dec. 9, 2021, for corresponding EP Patent Application No. 20900760.8 pp. 1-9.

International Search Report for PCT/JP2020/037003, pp. 1-9 (see the transmittal letter).

* cited by examiner

| USER ID | PASSWORD | PERSONAL INFORMATION | | | | MEMBERSHIP RANK | PAYMENT INFORMATION | CURRENT OVERALL SCORE |
| --- | --- | --- | --- | --- | --- | --- | --- | --- |
| | | NAME | ADDRESS | TELEPHONE NUMBER | ... | | | |
| u00001 | **** | TARO YAMADA | ... MINATO CITY, TOKYO | 03-AAAA-BBBB | ... | RANK A | ---** | 30 |
| u00002 | ****** | JIRO SUZUKI | ... SHIBUYA CITY, TOKYO | 03-CCCC-DDDD | ... | RANK S | ---** | 190 |
| ... | ... | ... | ... | ... | ... | ... | ... | ... |

| ACTION HISTORY INFORMATION | | | | PURCHASE HISTORY INFORMATION | | | |
| --- | --- | --- | --- | --- | --- | --- | --- |
| ACTION ID | ACTION CONTENT | INDIVIDUAL SCORE | ... | ORDER ID | ORDER DETAILS | OVERALL SCORE | FRAUD DETECTION RESULT |
| a10001 | USE REGISTRATION,IP ADDRESS1,... MINATO CITY,TOKYO | 5 | ... | o10001 | 20000YEN, ... MINATO CITY, TOKYO | 20 | NORMAL |
| a10002 | LOGIN,IP ADDRESS1... MINATO CITY,TOKYO | 2 | ... | o10002 | 4000YEN, ... SHINAGAWA CITY, TOKYO | 25 | NORMAL |
| a10003 | PAGE1,IP ADDRESS1... MINATO CITY,TOKYO | 4 | ... | o10003 | 15000YEN, ... MINATO CITY, TOKYO | 10 | NORMAL |
| ... | ... | ... | ... | ... | ... | ... | ... |
| a20001 | USE REGISTRATION,IP ADDRESS2,... SHIBUYA CITY,TOKYO | 5 | ... | o20001 | 1000YEN, ... MINATO CITY, TOKYO | 10 | NORMAL |
| a20002 | LOGIN,IP ADDRESS2... SHIBUYA CITY,TOKYO | 4 | ... | o20002 | 2500YEN, ... SHINAGAWA CITY, TOKYO | 14 | NORMAL |
| ... | ... | ... | ... | ... | ... | ... | ... |
| a20152 | LOGIN,IP ADDRESS3... RUSSIAN FEDERATION | 80 | ... | | | | |
| a20153 | LOGIN,IP ADDRESS4... RUSSIAN FEDERATION | 90 | ... | | | | |
| ... | ... | ... | ... | ... | ... | ... | ... |

FIG.5

| TYPE OF FEATURE AMOUNT | FEATURE AMOUNT SERVER | ACQUISITION TIME |
|---|---|---|
| FEATURE AMOUNT1 | 20-1 | 40ms |
| FEATURE AMOUNT2 | 20-2 | 30ms |
| FEATURE AMOUNT3 | 20-3 | 200ms |
| FEATURE AMOUNT4 | 20-4 | 50ms |
| ... | ... | ... |

| OVERALL SCORE | FEATURE AMOUNT SET | TOTAL ACQUISITION TIME | RATIO |
|---|---|---|---|
| 150~ | FEATURE AMOUNT SET A | 500ms | 5% |
| 100~149 | FEATURE AMOUNT SET B | 100ms | 15% |
| 0~99 | FEATURE AMOUNT SET C | 50ms | 80% |

D

FIG.7
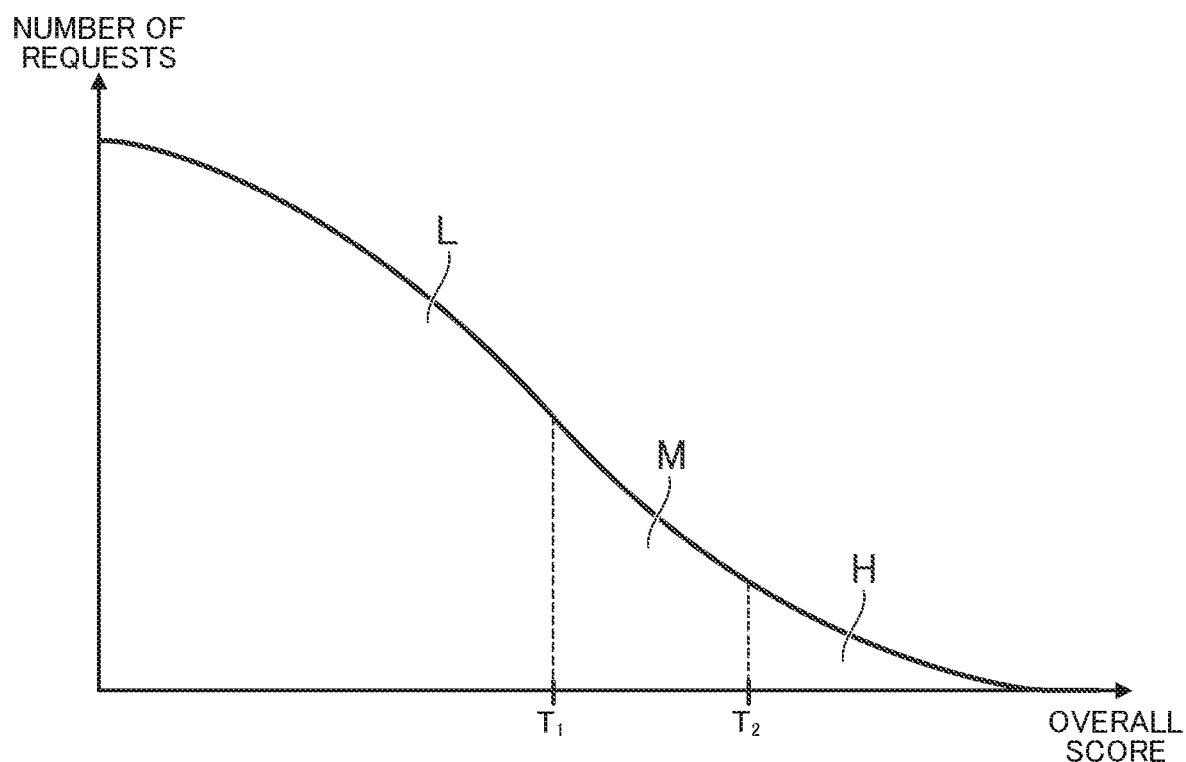
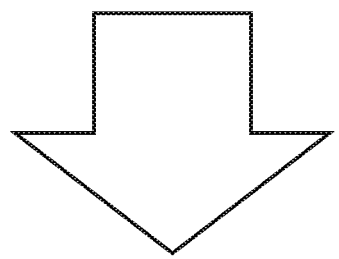
$50ms * 80\% + 100ms * 15\% + 500ms * 5\% = 80ms$

| TYPE OF FEATURE AMOUNT | FEATURE AMOUNT SERVER | ACQUISITION TIME | IMPORTANCE INDEX |
|---|---|---|---|
| FEATURE AMOUNT1 | 20-1 | 40ms | 10 |
| FEATURE AMOUNT2 | 20-2 | 30ms | 5 |
| FEATURE AMOUNT3 | 20-3 | 200ms | 30 |
| FEATURE AMOUNT4 | 20-4 | 50ms | 25 |
| ⋮ | ⋮ | ⋮ | ⋮ |

FRAUD DETECTION SYSTEM, FRAUD DETECTION METHOD AND PROGRAM

CROSS REFERENCE TO RELATED APPLICATIONS

This application is a National Stage of International Application No. PCT/JP2020/037003 filed on Sep. 29, 2020. The contents of the above document are incorporated herein by reference in its entirety.

TECHNICAL FIELD

This disclosure relates to a fraud detection system, a fraud detection method, and a program.

BACKGROUND ART

Hitherto, there has been known a technology for detecting fraud made by a user based on actions performed by the user. For example, in Patent Literature 1, there is described a system configured to create a learning model for detecting a fraudulent user by causing a learning model to learn training data in which feature amounts of users are used as inputs and determination results of normality levels of the users is outputs.

CITATION LIST

Patent Literature

[PTL 1] WO 2019/049210 A1

SUMMARY OF INVENTION

Technical Problem

However, in the technology of Patent Literature 1, the settings related to the acquisition of the feature amounts are common to all users, and therefore when an attempt is made to accurately detect fraud by using the learning model, it is required to acquire a large number of feature amounts for all the users. As a result, when the system as a whole is considered, fraud detection takes a long period of time.

One object of this disclosure is to shorten a period of time required for fraud detection.

Solution to Problem

According to one aspect of this disclosure, there is provided a fraud detection system including: score acquisition means for acquiring, based on an action performed by each of a plurality of users, a score relating to a fraud level of the each of the plurality of users; determination means for determining, based on the score of each of the plurality of users, an acquisition method for a feature amount of the each of the plurality of users such that an acquisition time of the feature amount becomes shorter as the fraud level becomes lower; feature amount acquisition means for acquiring the feature amount of each of the plurality of users based on the acquisition method determined for the each of the plurality of users; and detection means for detecting fraud made by each of the plurality of users based on the feature amount of the each of the plurality of users.

According to one aspect of this disclosure, there is provided a fraud detection method including: a score acquisition step of acquiring, based on an action performed by each of a plurality of users, a score relating to a fraud level of the each of the plurality of users; a determination step of determining, based on the score of each of the plurality of users, an acquisition method for a feature amount of the each of the plurality of users such that an acquisition time of the feature amount becomes shorter as the fraud level becomes lower; a feature amount acquisition step of acquiring the feature amount of each of the plurality of users based on the acquisition method determined for the each of the plurality of users; and a detection step of detecting fraud made by each of the plurality of users based on the feature amount of the each of the plurality of users.

According to one aspect of this disclosure, there is provided a program for causing a computer to function as: score acquisition means for acquiring, based on an action performed by each of a plurality of users, a score relating to a fraud level of each of the plurality of users; determination means for determining, based on the score of each of the plurality of users, an acquisition method for a feature amount of each of the plurality of users such that an acquisition time of the feature amount becomes shorter as the fraud level becomes lower; feature amount acquisition means for acquiring the feature amount of each of the plurality of users based on the acquisition method determined for the each of the plurality of users; and detection means for detecting fraud made by each of the plurality of users based on the feature amount of the each of the plurality of users.

According to one aspect of this disclosure, the fraud detection system further includes: reception means for receiving a request from each of the plurality of users; and setting means for setting the acquisition method based on the score of each of the plurality of users and a number of requests from each of the plurality of users such that the acquisition time becomes shorter as the fraud level becomes lower and the acquisition time as a whole falls within a predetermined range, and the determination means is configured to determine the acquisition method for each of the plurality of users based on the score of the each of the plurality of users and the setting.

According to one aspect of this disclosure, the setting means is configured to determine a length relating to the acquisition time for each of the scores, and to set the acquisition method based on the determined length.

According to one aspect of this disclosure, the setting means is configured to create a distribution relating to a relationship between the score and the number of requests, and to set the acquisition method based on the created distribution.

According to one aspect of this disclosure, the score acquisition means is configured to: acquire, based on each of a plurality of actions performed by each of the plurality of users, an individual score relating to the fraud level of the each of the plurality of actions performed by the each of the plurality of users; and acquire, based on the individual scores of each of the plurality of users, an overall score relating to an overall fraud level of the each of the plurality of users, and the determination means is configured to determine the acquisition method for each of the plurality of users such that the acquisition time becomes shorter as the fraud level of the overall score becomes lower.

According to one aspect of this disclosure, the score acquisition means is configured to acquire the overall score of each of the plurality of users further based on a decision tree in which each of the individual scores of the each of the plurality of users is a variable.

According to one aspect of this disclosure, the feature amount acquisition means is configured to acquire a plurality of types of feature amounts, the acquisition method is the type of the feature amount to be acquired, the determination means is configured to determine the type of the feature amount for each of the plurality of users such that the acquisition time becomes shorter as the fraud level becomes lower, and the feature amount acquisition means is configured to acquire the feature amount of the type determined for each of the plurality of users.

According to one aspect of this disclosure, each of the plurality of types of feature amounts is acquirable in parallel with each other, and the feature amount acquisition means is configured to acquire the feature amount of the type determined for each of the plurality of users and the feature amount of a type having a shorter acquisition time than the acquisition time of the determined type.

According to one aspect of this disclosure, the determination means is configured to determine the acquisition method for each of the plurality of users such that the feature amount important in fraud detection is acquired and the acquisition time becomes shorter as the fraud level becomes lower.

According to one aspect of this disclosure, the feature amount acquisition means is configured to acquire the plurality of types of feature amounts, the acquisition method is a time limit within which the feature amount is permitted to be acquired, the determination means is configured to determine the time limit for each of the plurality of users such that the time limit becomes shorter as the fraud level becomes lower, and the feature amount acquisition means is configured to acquire the feature amount of each of the plurality of users based on the time limit determined for the each of the plurality of users.

According to one aspect of this disclosure, the score acquisition means is configured to acquire the score of each of the plurality of users based on a first action performed by the each of the plurality of users, and the detection means is configured to detect fraud made by each of the plurality of users based on the feature amount of the each of the plurality of users when a second action after the first action is performed by the each of the plurality of users.

According to one aspect of this disclosure, the first action is an action up to a request for payment, the second action is the request for the payment, and the fraud detection system further includes restriction means for restricting execution of the payment by, among the plurality of users, a user for which fraud has been detected.

Advantageous Effects of Invention

According to this disclosure, it is possible to shorten the time required for the fraud detection.

BRIEF DESCRIPTION OF DRAWINGS

FIG. 4 is a table for showing a data storage example of a user database.

FIG. 5 is a table for showing a data storage example of a feature amount database.

FIG. 6 is a table for showing a data storage example of setting data.

FIG. 7 is a graph for showing an example of a distribution relating to a relationship between an overall score and the number of requests.

FIG. 12 is a table for showing a data storage example of a feature amount database in Modification Example (3) of this disclosure.

DESCRIPTION OF EMBODIMENTS

1. Overall Configuration of Fraud Detection System

Figure 1:
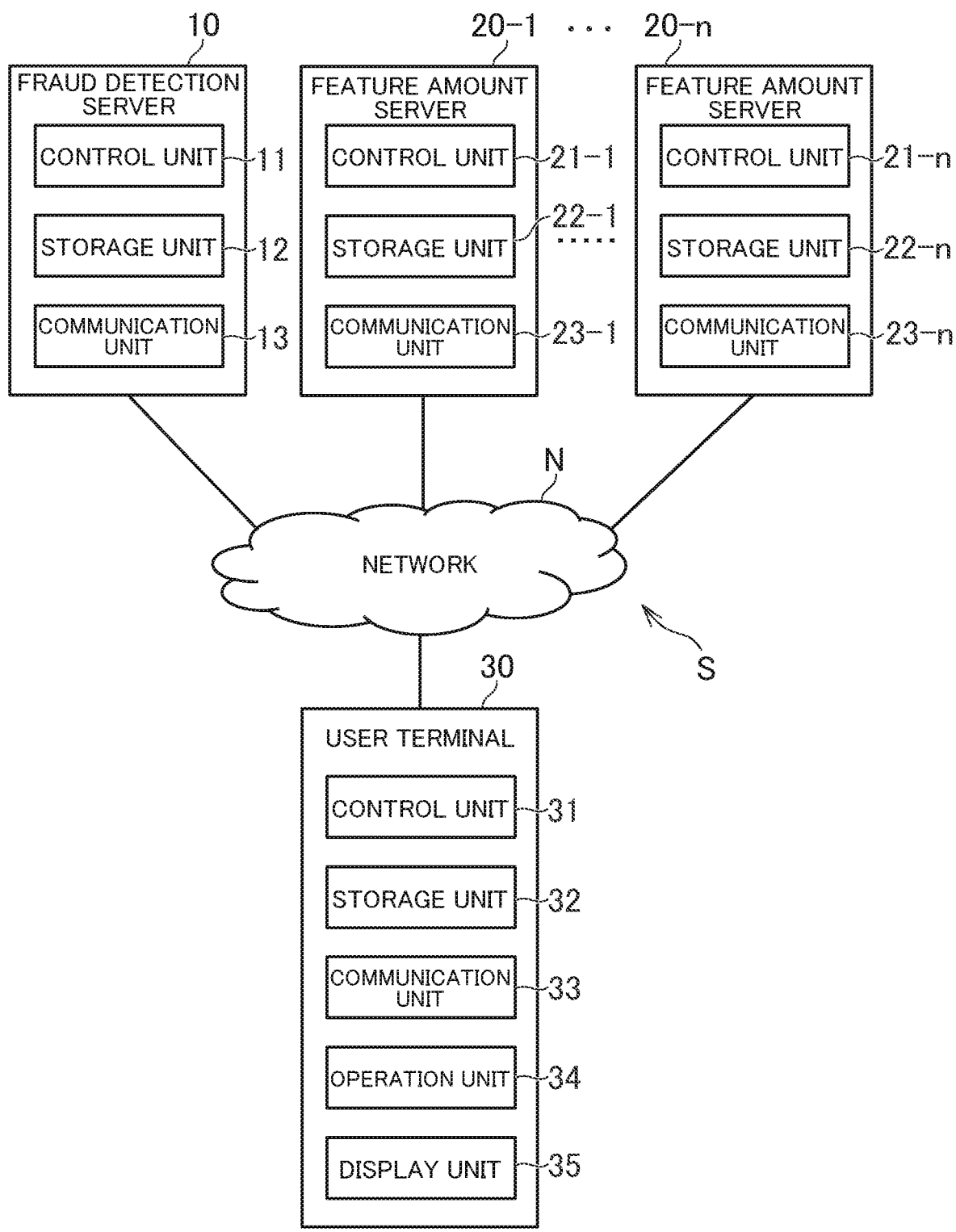
FIG. 1 is a diagram for illustrating an example of an overall configuration of a fraud detection system.

Description is now given of an example of an embodiment of a fraud detection system according to one aspect of this disclosure. FIG. 1 is a diagram for illustrating an example of an overall configuration of the fraud detection system. As illustrated in FIG. 1, a fraud detection system S includes a fraud detection server 10, feature amount servers 20-1 to 20-*n* (n is an integer of 2 or more), and a user terminal 30. Those parts can be connected to a network N, for example, the Internet. In FIG. 1, one fraud detection server 10 and one user terminal 30 are illustrated, but there may be a plurality of fraud detection servers 10 and user terminals 30.

In the following description, when the feature amount servers 20-1 to 20-*n* are not distinguished, those parts are simply referred to as "feature amount server 20." Similarly, when control units 21-1 to 21-*n*, storage units 22-1 to 22-*n*, and communication units 23-1 to 23-*n* are not distinguished, those parts are simply referred to as "control unit 21," "storage unit 22," and "communication unit 23," respectively. The total number of feature amount servers 20 is represented by "n". There may be only one feature amount server 20, and "n" may be 1. Further, the fraud detection system S is not required to include the feature amount server 20. In that case, the fraud detection server 10 may have the same functions as those of the feature amount server 20.

The fraud detection server 10 is a server computer. The fraud detection server 10 includes a control unit 11, a storage unit 12, and a communication unit 13. The control unit 11 includes at least one microprocessor. The control unit 11 executes processing as programmed by programs and data stored in the storage unit 12. The storage unit 12 includes a main memory unit and an auxiliary memory unit. For example, the main memory unit is a volatile memory, for example, a RAM. Further, for example, the auxiliary memory unit is a non-volatile memory such as a ROM, an EEPROM, a flash memory, or a hard disk drive. The communication unit 13 is a communication interface for wired communication or wireless communication.

The feature amount server 20 is a server computer. The feature amount server 20 includes a control unit 21, a storage unit 22, and a communication unit 23. Physical configurations of the control unit 21, the storage unit 22, and the communication unit 23 may be the same as those of the control unit 11, the storage unit 12, and the communication unit 13, respectively.

The user terminal 30 is a computer to be operated by a user. For example, the user terminal 30 is a mobile phone (including a smartphone), a portable information terminal (including a tablet computer), a personal computer, or the like. In this embodiment, the user terminal 30 includes a control unit 31, a storage unit 32, a communication unit 33, an operation unit 34, and a display unit 35.

The physical configurations of the control unit 31, the storage unit 32, and the communication unit 33 may be the same as those of the control unit 11, the storage unit 12, and the communication unit 13, respectively. The operation unit 34 is an input device. For example, the operation unit 34 is a touch panel, a mouse, a keyboard, or a button. For example, the display unit 35 is a liquid crystal display or an organic EL display.

Programs and data described as being stored into the storage units 12, 22, and 32 may be supplied thereto via the network N. Further, the respective hardware configurations of the fraud detection server 10, the feature amount server 20, and the user terminal 30 are not limited to the above-mentioned examples, and various types of hardware can be applied thereto. For example, the hardware configuration may include at least one of a reading unit (e.g., an optical disc drive or a memory card slot) configured to read a computer-readable information storage medium, and an input/output unit (e.g., a USB port) configured to input and output data to/from an external device. For example, the program and the data stored in the information storage medium may be supplied through intermediation of the reading unit or the input/output unit.

2. Overview of Fraud Detection System

The fraud detection system S is configured to detect fraud made by a user based on a feature amount of the user in a predetermined service. In this embodiment, an electronic commerce service is described as an example of the service, but the fraud detection server 10 can be applied to any service. For example, the fraud detection system S can also be applied to a financial service, a travel reservation service, a golf course reservation service, a communication service, an electronic payment services, a video distribution service, or an insurance application service.

The feature amount is information on a feature of the user. The feature amount itself may be any of various kinds of known feature amounts. For example, the feature amount may be a payment amount, a payment frequency, a page transition, an access frequency, an access location, an access time, identification information on the user terminal 30 used when the service is used, service usage content, an action on a service usage screen (for example, cursor trajectory), or a combination thereof. Further, for example, the feature amount may be acquired through use of a blacklist in which fraudulent users are registered.

The feature amount may be obtained from static information or through execution of certain calculation on the static information. Static information is information which does not require calculation. For example, static information is personal information on the user, a status, for example, membership rank, payment information, for example, a credit card number, a browsing history, or a purchase history. The feature amount can be expressed in any form, for example, by a single numerical value, a combination of a plurality of numerical values, a vector, an array, or a letter.

As used herein, "fraud" is the act of violating or the risk of violating the terms and conditions for using the service. Examples of fraud include fraudulent logins (spoofing or hijacking), attacks on computers, non-payment of fees, fraudulent acts, and false acts. As used herein, "detect" means determining whether or not there is fraud. In a case in which an administrator of the fraud detection system S performs the final determination of fraud, fraud detection can also be said to be fraud estimation or fraud guessing.

The user operates the user terminal 30 to perform various actions in the service. For example, the user can register to use the service, log in to the service, display a top page, execute a search, display a shop page, display a product page, add a product to a shopping cart, input a delivery address or the like, confirm an order (execute payment), change member information, check a browsing history, or check a purchase history. Those actions may be performed through use of an application installed on the user terminal 30 or may be performed through use of a browser.

All actions in the service may be the target of fraud detection, but in this embodiment, only a part of those actions are the target of fraud detection. Those actions are a relatively important action among the actions that can be taken by the user. In this embodiment, there is described a case in which the confirmation of an order (execution of payment) is the target of fraud detection, but any of the other actions may be the target of fraud detection. For example, a change in delivery address, a change in member information, or a confirmation of purchase history may be the target of fraud detection. The timing at which the action targeted for fraud detection is performed is hereinafter referred to as "fraud detection point." The user performs at least one action before reaching the fraud detection point.

Figure 2:
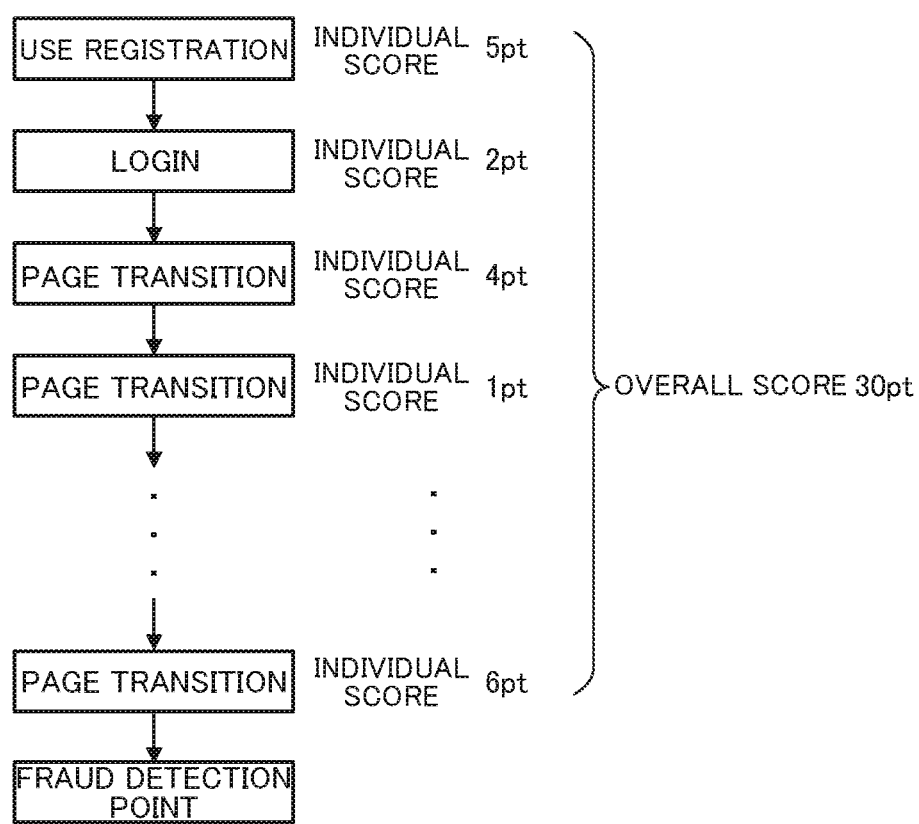
FIG. 2 is a diagram for illustrating an example of actions up to a fraud detection point.

FIG. 2 is a diagram for illustrating an example of actions up to the fraud detection point. The series of actions illustrated in FIG. 2 may be performed while the session between the fraud detection server 10 and the user terminal 30 is maintained, or while the session is established and disconnected repeatedly. For example, after the registration to use the service is performed and the session is disconnected, the session may be established again and the actions after login to the service may be performed. That is, fraud may be detected in consideration of only the actions in a certain session, or fraud may be detected in comprehensive consideration of the action across a plurality of sessions.

For example, the user registers to use the service, logs in to the service, and performs a page transition before reaching the fraud detection point. The user repeats page transitions and places at least one product in the shopping cart. The user inputs the required items, for example, the delivery address and payment method, and confirms the order. In this embodiment, an individual score relating to fraud made by the user is acquired for each individual action up to the fraud detection point.

The individual score is a score relating to a fraud level of an individual action. The fraud level is the degree, likelihood, or probability of fraud. The fraud level can also be an anomaly, a danger, or a suspicion of fraud. The individual score is only required to be an index which can represent the fraud level. In this embodiment, there is described a case in which the individual score is expressed as a single numerical value (for example, a point score), but the individual score can be expressed in any form. For example, the individual score may be expressed as a percentage, a ratio, a combination of a plurality of numerical values, a vector, an array, or a letter. Details of the individual score acquisition method are described later.

In the example of FIG. 2, an individual score for each of the use registration, login, and a plurality of page transitions performed up to the fraud detection point is calculated for the user. In this embodiment, those individual scores are combined into one overall score. Further, in this embodiment, there is described a case in which the overall score is acquired each time an individual score is acquired, but the overall score may be acquired for the first time when the fraud detection point is reached.

The overall score is the score relating to an overall fraud level of a plurality of actions. In other words, the overall score is a score relating to one fraud level which comprehensively considers the fraud level indicated by each of the plurality of individual scores. The overall score may be a score relating to the overall fraud level of a plurality of actions performed during a predetermined period in the past leading up to the fraud detection point. The overall score is only required to be an index that can represent the fraud level. In this embodiment, there is described a case in which the overall score is expressed as a single numerical value (for example, a point score), but the overall score can be expressed in any form. For example, the overall score can be expressed as a percentage, a ratio, a combination of a plurality of numerical values, a vector, an array, or a letter. The form of the overall score and the form of the individual score may be different from each other. For example, the overall score may be expressed as a percentage and the individual score may be expressed as a point score. Details of the overall score acquisition method are described later.

In this embodiment, there is described a case in which a high numerical value of each of the individual scores and the overall score means a high fraud level, but the individual scores and the overall score may be any score that can represent a fraud level. For example, a low numerical value of each of the individual scores and the overall score may mean that the fraud level is high. In this case, each of the individual scores and the overall score represent a normality level of the actions. The fraud level may be paradoxically represented by the individual scores and the overall score representing a normality level.

As described regarding the related art, when the fraud detection system S acquires feature amounts based on a setting common to all users, it is required to calculate many feature amounts for all the users. Even for the majority of normal users, when a large number of feature amounts are calculated, the fraud detection system S as a whole takes a long period of time to perform the fraud detection. As a result, it may take a long period of time to confirm the order, or the processing load on the fraud detection system S may increase.

In this regard, the fraud detection system S of this embodiment can infer to a certain extent whether or not a user is fraudulent based on the overall score of the user at the fraud detection point. That is, the fraud detection system S can determine based on the overall score whether to perform a careful check or whether to perform a simple check on the users who have reached the fraud detection point.

Accordingly, for users having a low overall score, the fraud detection system S acquires feature amounts having a relatively short acquisition time, and performs a simple check. For users having a high overall score, the fraud detection system S acquires feature amounts having a relatively long acquisition time, and performs a careful check. Thus, in this embodiment, the period of time required for fraud detection is shortened as a whole for the fraud detection system S by varying how the fraud detection is performed depending on the overall score. The details of this technology are now described.

3. Functions to be Implemented in Fraud Detection System

Figure 3:
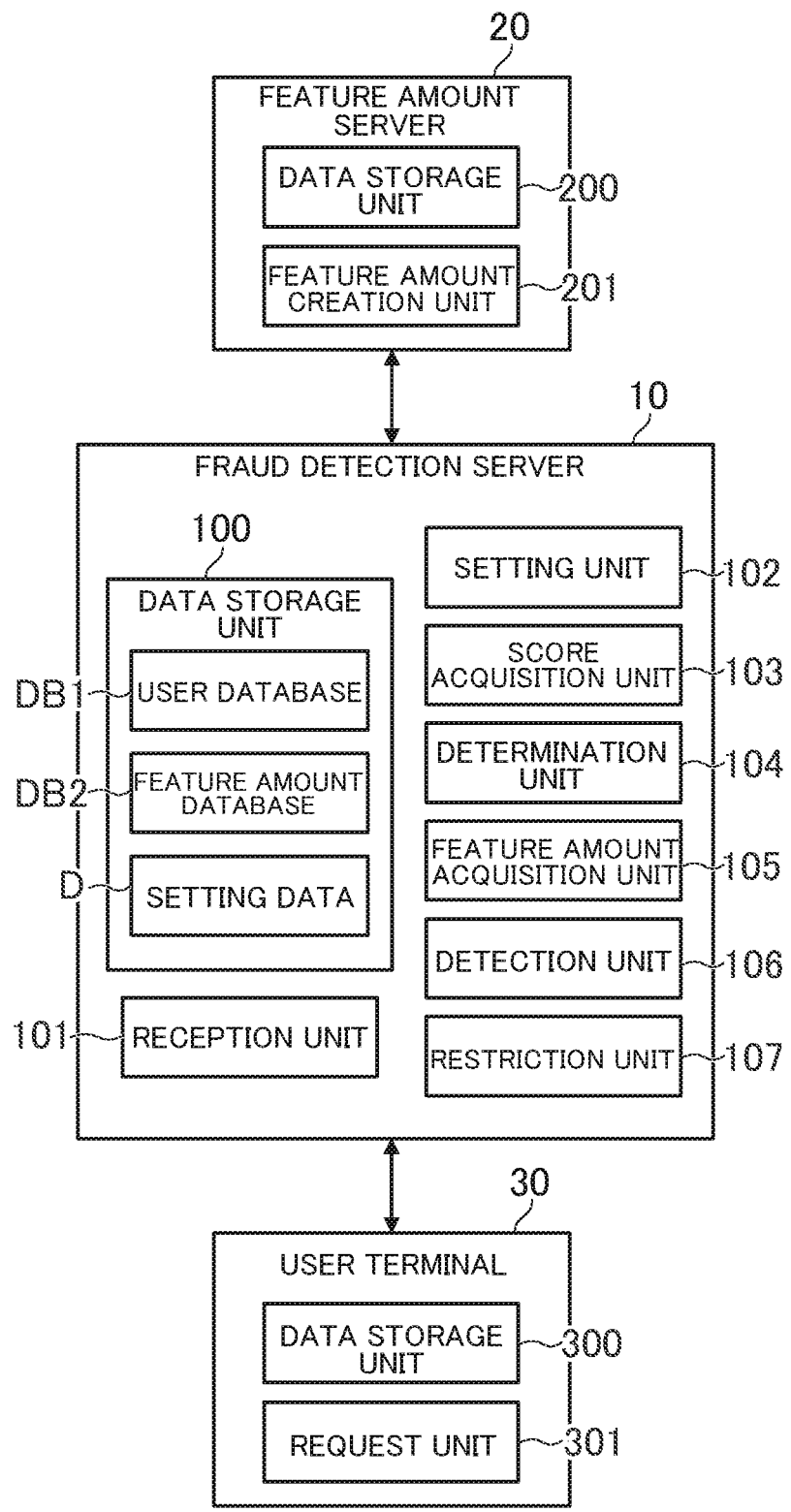
FIG. 3 is a function block diagram for illustrating an example of functions to be implemented in the fraud detection system.

FIG. 3 is a function block diagram for illustrating an example of the functions to be implemented in the fraud detection system S. In this embodiment, functions to be implemented in the fraud detection server 10, the feature amount server 20, and the user terminal 30 are described.

3-1. Functions to be Implemented in Fraud Detection Server

As illustrated in FIG. 3, the fraud detection server 10 includes a data storage unit 100, a reception unit 101, a setting unit 102, a score acquisition unit 103, a determination unit 104, a feature amount acquisition unit 105, a detection unit 106, and a restriction unit 107.

[Data Storage Unit]

The data storage unit 100 is mainly implemented by the storage unit 12. The data storage unit 100 is configured to store the data required for fraud detection. Here, as an example of the data stored in the data storage unit 100, there are described a user database DB1, a feature amount database DB2, and setting data D.

FIG. 4 is a table for showing a data storage example of the user database DB1. As shown in FIG. 4, the user database DB1 is a database in which various types of information on each of a plurality of users are stored. For example, the user database DB1 includes a user ID, a password, personal information, a membership rank, payment information, a current overall score, action history information, and purchase history information.

The user ID is information for uniquely identifying the user in the service. The user ID may also be referred to as "user account." Information on an electronic mail address, for example, may be used as the user ID. The user ID and the password are examples of authentication information required for login. Personal information is information which can identify a user. For example, personal information may be the name, home address, delivery address, telephone number, date of birth, gender, electronic mail address, or occupation of the user.

The payment information is information required for payment. For example, the payment information is a credit card number, a debit card number, or a bank account number. Further examples of the payment information include an account relating to an electronic payment application, electronic money, points, or an electronic wallet. For example, when the user completes use registration, the fraud detection server 10 creates a new record in the user database DB1 and registers the user ID, password, personal information, and payment information. Those pieces of information can be changed by a logged-in user.

The membership rank is updated in accordance with the usage status of the user. For example, the membership rank becomes higher as the amount of money used by the user or the frequency of use by the user becomes higher. The current overall score is an overall score acquired by the score acquisition unit 103, which is described later. When the user confirms an order, the overall score at that time is stored in the purchase history information. In this embodiment, the current overall score is updated each time the user performs an action and an individual score is acquired (each time action history information is added to the record of the user).

The action history information is information on the history of the actions by the user. For example, the action history information includes an action ID, an action content, and an individual score. The action ID is information for uniquely identifying each action. In this embodiment, an action ID is issued each time use registration, login, and page transition are performed. The action content is information indicating the specific content of the action. For example, the action content includes an action type, an IP address, an access location, an access date and time, a URL of the accessed page, and user operation content.

The action type is information indicating the specific action type among the plurality of action types which can be performed in the service. In this embodiment, three types of actions, namely, use registration, login, and page transition, are performed before the fraud detection point is reached, and therefore information indicating one of those three types is stored as the action type. The action type may be identified from the URL of the access destination page or the operation content of the user.

The IP address included in the action content is the IP address of the user terminal 30 used for each action. The access location is the location of the user or the user terminal 30 at each action. The access location may be inferred from the IP address, or may be acquired through use of GPS information, access point information, or mobile base station information.

The fraud detection server 10 issues, based on a predetermined issuing rule, an action ID each time the user performs some kind of action (each time a request is received from the user terminal 30). The fraud detection server 10 acquires the action type, for example, based on the information received from the user terminal 30, and stores the action type in the user database DB1 as action history information together with the issued action ID.

The purchase history information is information on the history of the products purchased by the user. For example, the purchase history information includes information on an order ID, order details, the overall score at the time of ordering, and a fraud detection result. The order ID is information for uniquely identifying the order. The order details are information on the specific content of the order. For example, the order details are a payment amount, a payment location, a product ID uniquely identifying the ordered product, and a purchase date and time. The overall score is the overall score obtained when the user confirms the order. The fraud detection result is a determination result of fraud obtained by the detection unit 106, which is described later, or a confirmation result of fraud obtained by the administrator.

FIG. 5 is a table for showing a data storage example of the feature amount database DB2. As shown in FIG. 5, the feature amount database DB2 is a database in which information on the feature amounts which can be acquired by the fraud detection system S is stored. For example, the feature amount database DB2 stores a type of the feature amount, identification information on the feature amount server 20, and the period of time (acquisition time) required to acquire the feature amount.

The type of the feature amount is the name of the feature amount. As described above, various known feature amounts can be used as the feature amounts themselves. For example, information obtained by converting at least one of all or a part of the personal information on the user, the membership rank, and the payment information into a numerical value may be used as a feature amount. Further, for example, information in which all or part of the action content included in the action history information is converted into a numerical value may be used as a feature amount. Moreover, for example, information obtained by converting all or a part of the order details included in the purchase history information into a numerical value may be used as a feature amount.

The identification information on the feature amount server 20 is information for identifying the feature amount server 20 creating the feature amount. For example, this information is the IP address or server name of the feature amount server 20. In this embodiment, a plurality of types of feature amounts can be created simultaneously in parallel, and one feature amount server 20 creates one type of feature amount. Consequently, there is a one-to-one correspondence between the types of the feature amounts and the feature amount servers 20. In addition, one feature amount server 20 may create a plurality of types of feature amounts. In this case, it is not required that the plurality of types of feature amounts be completely created simultaneously in parallel. That is, when it is required to create a plurality of types of feature amounts, the plurality of types of feature amounts are not required to be created simultaneously in parallel.

The acquisition time is the period of time required to acquire the feature amount. In other words, the acquisition time is the period of time from the start of the processing to acquire the feature amount until the completion of the processing to acquire the feature amount. In this embodiment, the acquisition time is the period of time from when the fraud detection server 10 transmits a request for creating a feature amount to the feature amount server 20 until the fraud detection server 10 receives the feature amount from the feature amount server 20. That is, the acquisition time includes the creation time required for the feature amount server 20 to create the feature amount and the transmission time required for the request and the transmission of the feature amount. When the fraud detection server 10 creates the feature amount by itself, the creation time and the acquisition time of the feature amount may match.

The acquisition time may be a predicted value or an actually measured value. The predicted value may be specified by the administrator or may be acquired by simulation. The actually measured value may be a statistical value measured for a certain period in the past, or may be a value measured at the time of acquiring a certain feature amount.

For example, when there is a larger number of items included in a certain feature amount, the acquisition time of the feature amount becomes longer. The number of items is the number of elements forming the feature amount. For example, when the feature amount is expressed in a vector format, the number of dimensions of the vector corresponds to the number of items. Further, for example, when the feature amount is expressed in an array format, the number of elements included in the array corresponds to the number of items. As the number of items becomes larger, the acquisition time becomes longer because it is required to refer to or calculate more information.

Further, for example, in the case of a feature amount created based on some kind of calculation, the acquisition time includes the calculation time required for the calculation of the feature amount. In this case, as the number of times of calculations required to acquire the feature amount becomes larger, the acquisition time becomes longer. Moreover, for example, in the case of a feature amount created by collation with some kind of list, as the number of pieces of data included in the list becomes larger, the acquisition time becomes longer. In addition, for example, in the case of a feature amount requiring some kind of aggregation, as the number of pieces of data to be aggregated becomes larger, the acquisition time becomes longer. Still further, for example, in the case of a feature amount created by referring to some kind of data, as the number of pieces of data to be referred to becomes larger, the acquisition time becomes longer.

The acquisition time may change depending on the feature amount server 20. For example, as the performance of the feature amount server 20 becomes lower, the acquisition time becomes longer. Further, for example, as the number of types of feature amounts to be created by one feature amount server 20 becomes larger, the acquisition time becomes longer. Moreover, for example, as the number of requests for the feature amount server 20 becomes larger, the acquisition time becomes longer. Still further, for example, as the communication environment of the feature amount server 20 becomes worse, the acquisition time becomes longer.

FIG. 6 is a table for showing a data storage example of the setting data D. As shown in FIG. 6, the setting data D is data relating to the settings performed by the setting unit 102. In this embodiment, there is described a case in which the types of feature amounts to be acquired are included as one of the settings, but as in the modification examples described later, the data D may include another setting, for example, a time limit. For example, the setting data D stores an overall score, a feature amount set, a total acquisition time, and a ratio.

In this embodiment, an overall score range is indicated in the setting data D. In the data storage example of FIG. 6, the overall score range is divided into three stages, namely, a high score range, a medium score range, and a low score range. The high score range is a range in which the overall score is equal to or more than a threshold value T1 (150 in FIG. 6). The medium score range is a range in which the overall score is less than the threshold value T1 and equal to or more than a threshold value T2 (100 in FIG. 6). The low score range is a range in which the overall score is less than the threshold value T2.

For example, a user having an overall score falling in the high score range is a user for which a careful check is required. Time is taken in order to acquire the feature amount set of such a user. Further, for example, a user having an overall score falling in the medium score range is a user for which a careful check of a certain level is required. Time is taken in order to acquire the feature amount set of such a user. Moreover, for example, a user having an overall score falling in the low score range is a user for which a simple check is sufficient. The feature amount set of such a user is acquired without taking much time.

The overall score range is not limited to the three stages as in this embodiment. For example, the overall score range may be divided into a range of two stages, or may be divided into a range of four or more stages. Further, in the setting data D, in place of an overall score range, the feature amount set and the total acquisition time may be defined for each individual value that can be taken by the overall score. For example, when the overall score is expressed as any value of from 0 to 199, 200 combinations of the feature amount set and the total acquisition time may be defined. In this case, a ratio is not defined.

The feature amount set is a combination of feature amounts to be acquired. In this embodiment, there is described a case in which the administrator selects the combination of the feature amounts, but the fraud detection server 10 may select the combination of feature amounts. That is, the combination of feature amounts may be manually selected by the administrator or may be automatically selected by the fraud detection server 10.

The total acquisition time is the period of time required to acquire all the feature amounts included in the feature amount set. As shown in FIG. 6, as the overall score becomes higher, the total acquisition time becomes longer, and as the overall score becomes lower, the total acquisition time becomes shorter. The total acquisition time is determined based on the acquisition time stored in the feature amount database DB2. When the feature amount set contains only one type of feature amount, the acquisition time for that type becomes the total acquisition time.

In this embodiment, the fraud detection system S can create each of the plurality of types of feature amounts in parallel. That is, while a certain feature amount server 20 is creating a feature amount, another feature amount server 20 can create another feature amount. Further, while a certain feature amount server 20 is executing a certain program to create a feature amount, that feature amount server 20 can execute another program in parallel to create another feature amount. When the number of prepared feature amount servers 20 is equal to the number of types of feature amounts defined in the feature amount database DB2 as in this embodiment, all the types of feature amounts can be completely created simultaneously in parallel.

When the feature amounts are created simultaneously in parallel, the total acquisition time is the longest acquisition time among the acquisition times of the feature amounts included in the feature amount set. For example, when the four feature amounts shown in FIG. 5 are included in the feature amount set, the total acquisition time of the feature amount set is "200 ms", which is the longest acquisition time.

When the feature amounts are not created simultaneously in parallel but are created one by one in order, the total acquisition time is the total value of the acquisition time of each feature amount. When each feature amount server 20 creates a feature amount one by one in order, and the plurality of feature amount servers 20 create the feature amounts simultaneously in parallel, the total acquisition time is the period of time of the feature amount server 20 requiring the longest period of time to create the feature amounts.

The ratio included in the setting data D is the ratio of the individual score range with respect to the overall fraud detection system S. In this embodiment, there is described a case in which the ratio included in the setting data D is the ratio of the number of requests in the individual score range to the number of requests of the overall fraud detection system S, but the ratio included in the setting data D may be the ratio of the number of users in the individual score range to the number of users of the overall fraud detection system S. Moreover, for example, in place of a ratio with respect to the overall fraud detection system S, the ratio included in the setting data D may be a ratio with respect to a part of the number of requests or the number of users.

In the data storage example of FIG. 6, the high score range (that is, threshold value T1) is defined such that the total number of requests from users having an overall score falling in the high score range is 5% of the total number of requests overall. The medium score range (that is, threshold values T1 and T2) is defined such that the total number of requests from users having an overall score falling in the medium score range is 15% of the total number of requests overall. The low score range (that is, threshold value T2) is defined such that the total number of requests from users having an overall score falling in the low score range is 80% of the total number of requests overall. In this embodiment, as the overall score becomes higher, the ratio becomes lower, and as the overall score becomes lower, the ratio becomes higher. The setting unit, which is described later, determines the threshold values T1 and T2 of each score range so that the ratio is the ratio included in the setting data D.

The data stored in the data storage unit 100 is not limited to the example described above. For example, the data storage unit 100 may store programs and parameters of each of a learning model for individual score acquisition, a learning model for overall score acquisition, and a learning model for fraud detection. Those learning models may be unsupervised learning models or supervised learning models. In the case of a supervised learning model, it is assumed that the learning model has been trained by training data. Further, for example, when a learning model is not used, the data storage unit 100 stores a program for individual score acquisition, a program for overall score acquisition, and a program for fraud detection.

[Reception Unit]

The reception unit 101 is mainly implemented by the control unit 11. The reception unit 101 is configured to receive requests from each of the plurality of users. A request is performed by transmitting data having a predetermined format. The reception unit 101 receives a request by receiving data having the predetermined format from the user terminal 30. The user performs at least one action by transmitting the request. That is, transmitting some kind of data from the user terminal 30 to the fraud detection server 10 corresponds to an action.

In this embodiment, the reception unit 101 receives a request corresponding to the action that is the target of fraud detection. For example, the reception unit 101 receives a request for confirming an order from the user terminal 30. The reception unit 101 may receive a request corresponding to an action other than the action that is the target of fraud detection. For example, the reception unit 101 may receive requests for each of use registration, login, and page transition.

[Setting Unit]

The setting unit 102 is mainly implemented by the control unit 11. The setting unit 102 is configured to set the method of acquiring a feature amount. The acquisition method is the method of acquiring the feature amount by the feature amount acquisition unit 105, which is described later. In this embodiment, the type of the feature amount to be acquired corresponds to the acquisition method. Thus, the setting unit 102 sets the type of the feature amount to be acquired.

In this embodiment, the setting unit 102 creates the setting data D and records the created setting data D in the data storage unit 100. For example, the setting unit 102 sets the setting data D such that as the overall score becomes lower, the total acquisition time becomes shorter. That is, the setting unit 102 sets the setting data D such that as the overall score becomes higher, the total acquisition time becomes longer. As described above, in this embodiment, of the setting data D, the feature amount set and the ratio are specified by the administrator, and the total acquisition time is determined from the feature amount set specified by the administrator. Accordingly, the setting unit 102 sets the threshold values T1 and T2 of each score range.

For example, based on the overall score of each of the plurality of users and the number of requests from each of the plurality of users, the setting unit 102 sets the acquisition method such that the acquisition time becomes shorter as the fraud level becomes lower, and the acquisition time as a whole falls within a predetermined range. For example, the setting unit 102 creates a distribution relating to the relationship between the overall score and the number of requests, and performs setting based on the created distribution.

FIG. 7 is a graph for showing an example of a distribution relating to a relationship between the overall score and the number of requests. In FIG. 7, the horizontal axis is the overall score and the vertical axis is the number of requests. The distribution of FIG. 7 shows, for each value that can be taken by the overall score, the total number of requests from users having an overall score of that value. For example, the setting unit 102 refers to the purchase history information in the user database DB1, counts, for each value that can be taken by the overall score, the number of requests (for example, the number of pieces of purchase history information) from the users having an overall score of that value, and creates a distribution.

The distribution of FIG. 7 may cover the entire past period or a part of the period. When the distribution covers a part of the period, the period may be any period. For example, the period may be a period of the latest several hours to several months, or may be a period other than the latest period. As described above, the number of suspected fraudulent users is actually small, and thus the majority of users have a low overall score. For that reason, in many distributions, as the overall score becomes higher, the number of requests becomes smaller.

In this embodiment, the setting unit 102 sets the threshold values T1 and T2 of each score range such that the distribution is divided by the ratios indicated in the setting data D. In the data storage example of FIG. 6, the setting unit 102 sets the threshold values T1 and T2 such that the high score range H, the medium score range M, and the low score range L of the distribution of FIG. 7 are divided into 5%, 15%, and 80%, respectively.

That is, the setting unit 102 sets the threshold values T1 and T2 such that the total number of requests in the high score range H, the total number of requests in the medium score range M, and the total number of requests in the low score range L are, when divided by the total number of requests of the entire distribution of FIG. 7, 5%, 15%, and 80%, respectively. Depending on the number of requests, it may not be possible to divide the requests by those ratios exactly, and hence it is sufficient to set the threshold values T1 and T2 such that the total numbers of requests are roughly those ratios.

When the threshold values T1 and T2 are set as described above, as shown in FIG. 7, an expected value (average value) of the acquisition time of the fraud detection system S as a whole is "50 ms×80%+100 ms×15%+500 ms×5%", namely, "80 ms". When a setting common to all users is set, the expected value may be "500 ms", which is the longest, but by varying the fraud detection based on the overall score, as in this embodiment, the expected value of the acquisition time can be reduced.

The overall score is merely a suspicion of fraud, and hence it is often the case that a user having a high overall score does not actually perform fraud. In this embodiment, there is described a case in which fraud detection is performed in real time when the service is used, and therefore, when too much time is taken to acquire the feature amount for a user in the high score range H, a service level agreement may not be satisfied. Thus, in this embodiment, it is not sufficient that the expected value as a whole of "80 ms" satisfies the service level agreement, and the expected value is set such that "500 ms", which is the longest, also satisfies the service level agreement. In a case in which real-time fraud detection is not performed, it is not particularly required to consider a service level agreement.

Further, in place of the administrator selecting a feature amount set for each overall score, the setting unit 102 may select the feature amount set. For example, the setting unit 102 performs setting such that the feature amount set having the shortest total acquisition time is associated with the low score range L. Moreover, for example, the setting unit 102 performs setting such that a feature amount set having a medium total acquisition time is associated with the medium score range M. In addition, for example, the setting unit 102 performs setting such that the feature amount set having the longest total acquisition time is associated with the high score range H. The setting unit 102 can select any feature amount so as to fall within each total acquisition time. For example, the setting unit 102 may randomly select feature amounts so as to fall within the total acquisition time, or may select as many feature amounts as possible in descending order of an importance index, which is described later in the modification examples of this disclosure.

Further, in place of the administrator determining the total acquisition time by selecting the feature amount set, the setting unit 102 may determine the total acquisition time. For example, the setting unit 102 determines the total acquisition time for each overall score, and performs setting based on the determined total acquisition time. The total acquisition time is an example of the length of the acquisition time. Thus, in the description of this embodiment, the term "total acquisition time" can be read as "length of the acquisition time." For example, the setting unit 102 sets the total acquisition time such that as the overall score becomes lower, the total acquisition time becomes shorter. That is, the setting unit 102 sets the total acquisition time such that as the overall score becomes higher, the total acquisition time becomes longer.

The setting unit 102 may perform setting without using a distribution like that shown in FIG. 7. For example, the setting unit 102 may set at least one of the threshold values T1 and T2 of the score ranges, the feature amount set, the total acquisition time, and the ratios without considering the expected value of the acquisition time as a whole. Further, for example, all of those may be specified by the administrator. In this case, the setting unit 102 may create the setting data D by acquiring the contents specified by the administrator from the computer operated by the administrator. In this case, creating the setting data D based on the contents specified by the administrator and recording the created setting data D in the data storage unit 100 corresponds to performing setting.

[Score Acquisition Unit]

The score acquisition unit 103 is mainly implemented by the control unit 11. The score acquisition unit 103 is configured to acquire a score relating to the fraud level of each of the plurality of users based on the actions performed by each of the plurality of users. In this embodiment, an individual score and an overall score are described as examples of this score, but the score is not limited to the example of this embodiment. For example, in place of acquiring individual scores, the score acquisition unit 103 may acquire one score for a plurality of actions. Further, for example, the score acquisition unit 103 may acquire only individual scores without combining individual scores into one as in the case of the overall score. Moreover, for example, the score acquisition unit 103 is not required to acquire individual scores for all actions, and may acquire individual scores for only a part of the actions.

For example, the score acquisition unit 103 acquires, based on each of the plurality of actions performed by each of the plurality of users, an individual score relating to the fraud level of each action performed by each user. As the method of acquiring the individual score, a known method can be used. For example, the score acquisition unit 103 may acquire the individual score by acquiring the feature amount of each action and inputting the feature amounts into a learning model for individual score acquisition. The feature amounts may be created by the feature amount server 20 or by the fraud detection server 10. The feature amounts may be the same as the feature amounts defined in the feature amount database DB2, or may be different types of feature amounts from those feature amounts. As the feature amounts themselves, various known feature amounts can be used.

When a supervised learning model is used, training data in which the feature amount of each action is an input and the individual score (or a value indicating whether or not the action is fraudulent) is an output is learned. Further, for example, the score acquisition unit 103 may acquire the individual score by using an unsupervised learning model. Moreover, for example, the score acquisition unit 103 may determine whether or not each action matches a predetermined rule, and acquire the individual score. In this case, a relationship between the content of the action and the individual score is defined in the rule.

The score acquisition unit 103 acquires, based on the individual scores of each of the plurality of users, the overall score relating to the overall fraud level of each user. As the method of acquiring the overall score, a known method can be used. A method of integrating a plurality of indexes for evaluating the actions of a user into one index may be used. The overall score of a certain user may be obtained from the individual scores of all the past actions of the user, or may be obtained from the individual scores of a part of the past actions of the user. For example, only the individual scores of the actions after the confirmation of a previous order may be reflected in the overall score.

For example, the score acquisition unit 103 may acquire the overall score by using a learning model in which a plurality of individual scores are inputs and the overall score is the output. In the case of an unsupervised learning model, as the overall score, the score acquisition unit 103 may acquire a score calculated by performing statistical outlier detection by using a known SmartSifter (outlier search engine). Further, for example, the score acquisition unit 103 may acquire, as the overall score, a loss function of a restoration error at the time when a known variational autoencoder is used.

For example, in the case of a supervised learning model, the score acquisition unit 103 may acquire the overall score by using a learning model trained through use of learning data in which a plurality of individual scores of a certain user are inputs and information indicating whether or not the user is fraudulent is the output. In addition, for example, the score acquisition unit 103 may acquire the overall score by using a decision tree like that in the modification examples described later.

Further, for example, in place of using a learning model, the score acquisition unit 103 may acquire the overall score by substituting a plurality of individual scores into a predetermined calculation formula. The formula may include a predetermined weighting coefficient. The weighting coefficient can be set to any value. The weighting of the individual score of a predetermined type of action may be increased. For example, the weighting of use registration and login may be higher than the weighting of page transitions.

Further, for example, the elapsed period of time from the acquisition of the individual score may be considered as the weighting. For example, as the elapsed period of time from the acquisition of the individual score (that is, the elapsed period of time from the action) becomes longer, the weighting may be decreased. Moreover, for example, the score acquisition unit 103 may acquire an average value or a median value of weighted individual scores as the overall score in place of an addition value of weighted individual scores.

In this embodiment, the score acquisition unit 103 acquires the individual scores of each of the plurality of users based on the actions performed by the users in each of use registration, login, and page transition. The actions in each of use registration, login, and page transition are examples of a first action. For that reason, in this embodiment, descriptions about those actions can be read as "first action".

The first action is an action performed up to the point at which a second action described later is performed. In this embodiment, confirming an order is an example of a second action. For that reason, in this embodiment, descriptions about "confirming an order" can be read as "second action". The second action is an action performed at the fraud detection point, and may be any action. For example, when payment is executed at a timing before or after an order is confirmed in place of executing payment when the order is confirmed, the second action may be a payment request executed at that timing.

In this embodiment, each time a certain user performs a first action, the score acquisition unit 103 updates each of the individual scores and the overall score of that user. When a certain user performs the second action described later, the score acquisition unit 103 may acquire each of the individual scores and the overall score of the user. Further, the score acquisition unit 103 may acquire only the individual scores of the certain user in advance, and acquire the overall score when the second action is performed. The timing at which the individual scores and the overall score are acquired is not limited to those examples, and may be any timing. The score acquisition unit 103 stores the individual scores and overall score acquired in this manner in the user database DB1.

[Determination Unit]

The determination unit 104 is mainly implemented by the control unit 11. The determination unit 104 is configured to determine, based on the overall score of each of the plurality of users, the acquisition method for the feature amount of each user such that the acquisition time of the feature amount becomes shorter as the fraud level indicated by the overall score becomes lower. In this embodiment, there is described a case in which the acquisition method is determined based on the overall score, but in a case of not using the overall score, the acquisition method may be determined based on a certain score acquired by the score acquisition unit 103.

Even when a score other than the overall score is used, it is assumed that the setting data D indicating the relationship between that score and the acquisition method is defined as a setting. The determination unit 104 may determine, based on the scores and settings of each of the plurality of users, the acquisition method for each user. The determination unit 104 refers to the setting data D, and identifies the acquisition method associated with the score of a certain user. The determination unit 104 determines the identified acquisition method as the acquisition method for the user.

In this embodiment, the determination unit 104 determines the acquisition method for each of the plurality of users such that the acquisition time becomes shorter as the fraud level becomes lower. That is, the determination unit 104 determines the acquisition method for each of the plurality of users such that the acquisition time becomes longer as the fraud level becomes higher. In this embodiment, a low numerical value of the overall score means a low fraud level, and therefore the determination unit 104 determines the acquisition method for a certain user such that the acquisition time becomes shorter as the numerical value of the overall score of the user becomes lower. That is, the determination unit 104 determines the acquisition method for a certain user such that the acquisition time becomes longer as the numerical value of the overall score of the user becomes higher.

In cases in which a high numerical value of the overall score means that the fraud level is low (in cases in which the overall score indicates the normality level of the user), the determination unit 104 determines the acquisition method for a certain user such that the acquisition time becomes shorter as the numerical value of the overall score of the user becomes higher. That is, the determination unit 104 determines the acquisition method for a certain user such that the acquisition time becomes longer as the numerical value of the overall score of the user becomes lower.

In this embodiment, the type of the feature amount to be acquired corresponds to the acquisition method, and therefore the determination unit 104 determines the type of the feature amount for each of the plurality of users such that the acquisition time becomes shorter as the fraud level becomes lower. As shown in the setting data D of FIG. 6, a feature amount set is defined such that the total acquisition time becomes longer as the numerical value of the overall score becomes higher. The determination unit 104 refers to the setting data D, and identifies the score range in which the overall score of a certain user falls. The determination unit 104 determines the acquisition method for the user by identifying the feature amount set associated with the score range.

[Feature Amount Acquisition Unit]

The feature amount acquisition unit 105 is mainly implemented by the control unit 11. The feature amount acquisition unit 105 is configured to acquire, based on the acquisition method for each of the plurality of users, the feature amounts of each user. In this embodiment, the feature amount acquisition unit 105 can acquire a plurality of types of feature amounts, and the feature amount acquisition unit 105 acquires the feature amounts of the types determined for each of the plurality of users.

For example, the feature amount acquisition unit 105 refers to the feature amount database DB2, and identifies the feature amount server 20 which creates the feature amount to be acquired. The feature amount acquisition unit 105 transmits a request to create the feature amount to the identified feature amount server 20. A feature amount creation unit 201, which is described later, of the feature amount server 20 creates the feature amount in response to the request, and transmits the created feature amount to the fraud detection server 10. The feature amount acquisition unit 105 receives the feature amount from the feature amount server 20.

When the feature amount server 20 is not included in the fraud detection system S, the feature amount acquisition unit 105 may acquire the feature amount by executing the same processing as that of the feature amount creation unit 201 described later to create the feature amount by itself. Moreover, for example, the creation of the feature amount may be shared by the feature amount acquisition unit 105 of the fraud detection server 10 and the feature amount creation unit 201 of the feature amount server 20.

[Detection Unit]

The detection unit 106 is mainly implemented by the control unit 11. The detection unit 106 is configured to detect, based on the feature amount of each of the plurality of users, fraud made by the users. Various known methods can be used as the method of detecting fraud based on the feature amount. For example, when a learning model for fraud detection is used, the detection unit 106 inputs the feature amount of a certain user into the learning model, and acquires the result of fraud detection output from the learning model, to thereby detect fraud made by that user.

In this embodiment, when a second action (for example, confirmation of an order or request for payment) is performed by each of the plurality of users after a first action (for example, use registration, login, or page transition), the detection unit 106 detects fraud made by the users based on the feature amounts of the users. For example, the detection unit 106 detects fraud made by a user when a request by that user is received. The fraud detection processing may be executed before payment execution or after payment execution.

In this embodiment, a feature amount set defined in the setting data D is used in the fraud detection, and therefore a learning model may be prepared for each feature amount set acquired by the feature amount acquisition unit 105, or a learning model common to a plurality of feature amount sets may be used. When a common learning model is used, feature amounts having insufficient input data may be processed as a missing value. In addition, for example, a learning model may not be used. In this case, a rule relating to the feature amount may be prepared, and the detection unit 106 may detect fraud made by the user based on the feature amount set acquired by the feature amount acquisition unit 105 and the rule. The detection result obtained by the detection unit 106 is stored in the user database DB1.

[Restriction Unit]

The restriction unit 107 is mainly implemented by the control unit 11. The restriction unit 107 is configured to restrict execution of payment by, among the plurality of users, a user for which fraud has been detected. As used herein, "restrict" means preventing the execution of the payment. This may mean prohibiting the execution of the payment, or may mean deferring the execution of the payment. When the payment is deferred, the deferred payment may be permitted based on a confirmation by the administrator. In this case, the restriction unit 107 presents to the administrator a list of users or orders for which fraud has been detected by the detection unit 106.

3-2. Functions to be Implemented in Feature Amount Server

As illustrated in FIG. 3, the feature amount server 20 includes a data storage unit 200 and the feature amount creation unit 201.

[Data Storage Unit]

The data storage unit 200 is mainly implemented by the storage unit 22. The data storage unit 200 is configured to store the data required to create feature amounts. For example, the data storage unit 200 stores a program for creating feature amounts. The program defines the types of data required to create the feature amounts and a procedure for creating the feature amounts. For feature amounts that are required to be calculated, formulas are defined in the program.

[Feature Amount Creation Unit]

The feature amount creation unit 201 is mainly implemented by the control unit 21. The feature amount creation unit 201 is configured to create a feature amount based on a request from the fraud detection server 10, and to transmit the feature amount to the fraud detection server 10. As described above, various known methods can be used as the method of creating the feature amount. The feature amount creation unit 201 executes the program stored in the data storage unit 200, and creates a feature amount of the type indicated by the request from the fraud detection server 10. The feature amount creation unit 201 transmits the created feature amount to the fraud detection server 10.

3-3. Functions to be Implemented in User Terminal

As illustrated in FIG. 3, the user terminal 30 includes a data storage unit 300 and a request unit 301.

[Data Storage Unit]

The data storage unit 300 is mainly implemented by the storage unit 32. The data storage unit 300 is configured to store the data required for the user to use the service. For example, the data storage unit 300 stores an application for using the service.

[Request Unit]

The request unit 301 is mainly implemented by the control unit 31. The request unit 301 is configured to transmit, based on an operation performed by the user, a request for confirming the order to the fraud detection server 10.

4. Processing to be Executed in Fraud Detection System

Next, processing to be executed in the fraud detection system S is described. In this embodiment, setting processing for setting the acquisition method for a feature amount and fraud detection processing for detecting fraud made by the user are described.

4-1. Setting Processing

Figure 8:
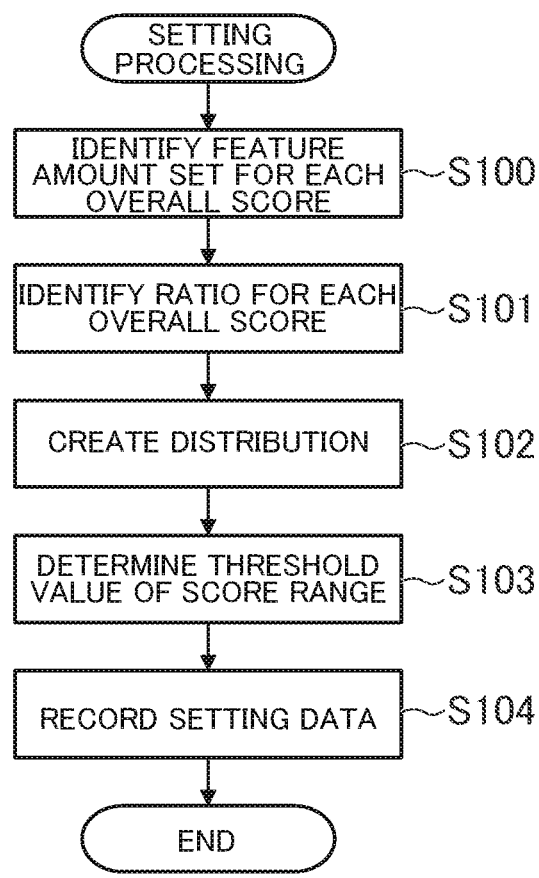
FIG. 8 is a flowchart for illustrating an example of setting processing.

FIG. 8 is a flowchart for illustrating an example of setting processing. The setting processing illustrated in FIG. 8 is executed by the control unit 11 operating in accordance with a program stored in the storage unit 12. The setting processing is an example of processing to be executed by the function blocks illustrated in FIG. 3. The setting processing can be executed at any timing, and may be executed at a timing for reviewing the contents of the setting data D based on the distribution of the latest requests.

As illustrated in FIG. 8, the fraud detection server 10 identifies a feature amount set for each overall score, which is specified by the administrator (Step S100). In Step S100, the administrator operates a computer communicably connected to the fraud detection server 10 to specify the feature amount set. For example, a list of the feature amounts stored in the feature amount database DB2 is displayed on the screen of the computer. The administrator specifies any combination from the list. In this embodiment, the administrator considers the acquisition time of the feature amounts, and specifies a feature amount set for each of the high score range H, the medium score range M, and the low score range L. When a feature amount set is identified, the total acquisition time of that feature amount set is also identified.

The fraud detection server 10 identifies a ratio for each overall score, which is specified by the administrator (Step S101). In Step S101, the administrator operates the above-mentioned computer to specify the ratio of each score range. The administrator specifies from the above-mentioned screen the ratio of each of the high score range H, the medium score range M, and the low score range L. In the example of FIG. 6 and FIG. 7, the administrator specifies ratios such as 5%, 15%, and 80%.

The fraud detection server 10 creates a distribution relating to the relationship between the value of the overall score and the number of requests based on the user database DB1 (Step S102). In Step S102, the fraud detection server 10 aggregates the number of requests for each value of the overall score based on the purchase history information included in the user database DB1, and creates a distribution like that shown in FIG. 7.

The fraud detection server 10 determines, based on the distribution created in Step S102 and the feature amount database DB2, threshold values T1 and T2 of the score range such that the acquisition time of the feature amount falls within a predetermined range for the fraud detection system S as a whole (Step S103). In Step S103, the fraud detection server 10 determines the threshold values T1 and T2 such that the score range is divided by the ratios specified by the administrator.

The fraud detection server 10 performs setting by recording, in the storage unit 12, setting data D including the score range corresponding to the threshold values T1 and T2 determined in Step S103 and the feature amount set identified in Step S101 (Step S104), and this processing ends.

4-2. Fraud Detection Processing

Figure 9:
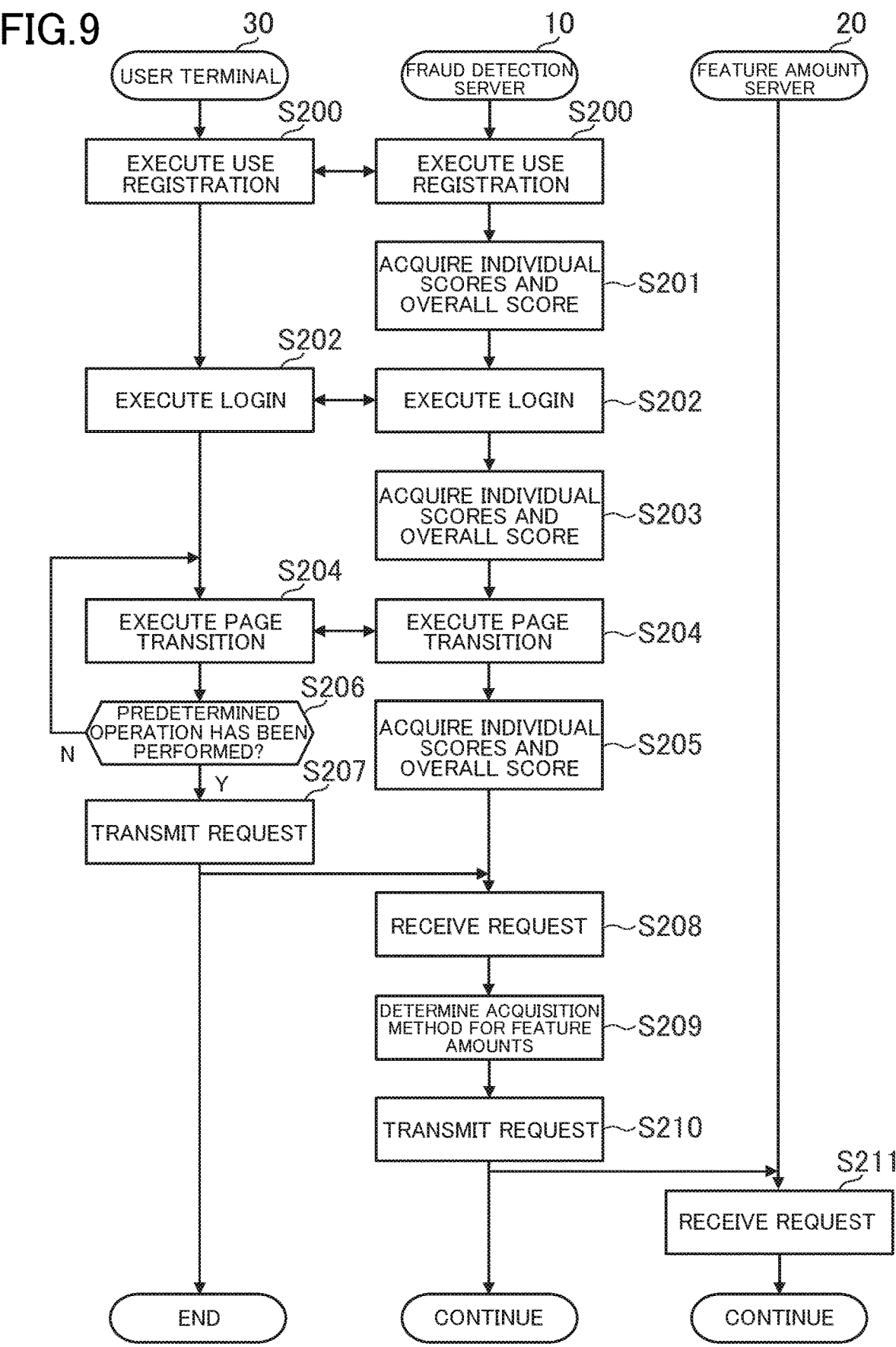
FIG. 9 is a flowchart for illustrating an example of fraud detection processing.
Figure 10:
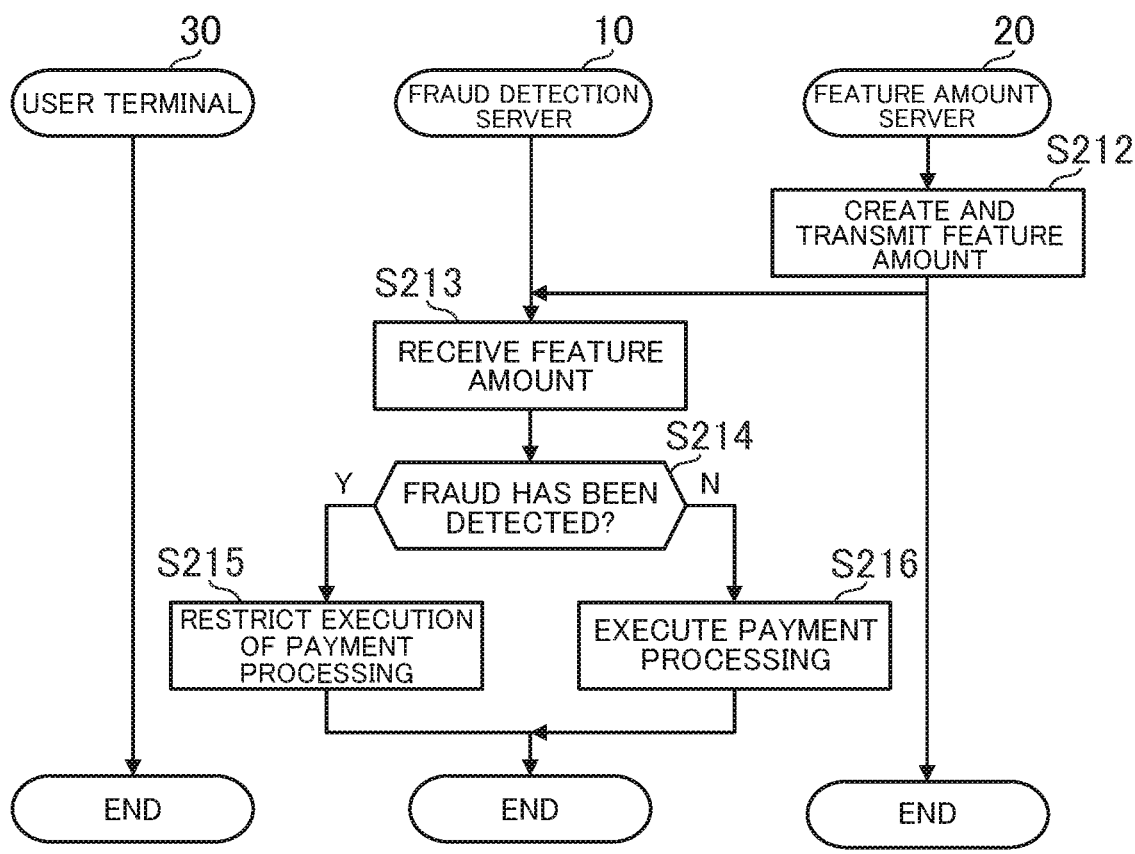
FIG. 10 is a flowchart for illustrating an example of the fraud detection processing.

FIG. 9 and FIG. 10 are flowcharts for illustrating an example of fraud detection processing. The fraud detection processing illustrated in FIG. 9 and FIG. 10 is executed by the control units 11, 21, and 31 operating in accordance with programs stored in the storage units 12, 22, and 32, respectively. The fraud detection processing is an example of processing to be executed by the function blocks illustrated in FIG. 3. The fraud detection processing is executed when the user uses the service.

As illustrated in FIG. 9, service use registration is executed between the fraud detection server 10 and the user terminal 30 (Step S200), and the fraud detection server 10 acquires the individual scores and an overall score (Step S201). In Step S200, a new record is created in the user database DB1, and the information input by the user at the time of use registration is stored in association with the newly issued user ID. In Step S201, the fraud detection server 10 acquires the individual scores based on, for example, the information input by the user at the time of use registration, includes the individual scores in the action history information, and stores the individual scores in the user database DB1. The fraud detection server 10 acquires an overall score based on the individual scores, and stores the overall score in the user database DB1.

Login to the service is executed between the fraud detection server 10 and the user terminal 30 (Step S202), and the fraud detection server 10 acquires the individual scores and the overall score (Step S203). In Step S202, the fraud detection server 10 executes authentication based on the user ID and the password received from the user terminal 30, and permits login when the authentication is successful. In Step S203, the fraud detection server 10 acquires the individual score based on information on, for example, the access location at the time of login, includes the individual scores in the action history information, and stores the individual scores in the user database DB1. The processing of acquiring the overall score is the same as that of Step S201.

Page transition processing is executed between the fraud detection server 10 and the user terminal 30 (Step S204), and the fraud detection server 10 acquires the individual scores and the overall score (Step S205). In Step S204, the fraud detection server 10 displays the page requested by the user terminal 30 on the user terminal 30. In Step S205, the fraud detection server 10 acquires the individual score based on information on, for example, the access location at the time of page transition, includes the individual scores in the action history information, and stores the individual scores in the user database DB1. The processing of acquiring the overall score is the same as that of Step S201.

The user terminal 30 determines whether or not a predetermined operation for confirming the order has been performed based on a detection signal from the operation unit 34 (Step S206). This operation is performed on a screen for confirming the order. When it is not determined that the predetermined operation has been performed (Step S206: N), the processing returns to Step S204, and the page transition processing is executed. Meanwhile, when it is determined that the predetermined operation has been performed (Step S206: Y), the user terminal 30 transmits an order confirmation request to the fraud detection server 10 (Step S207).

When the fraud detection server 10 receives the order confirmation request (Step S208), the fraud detection server 10 determines the method of acquiring the feature amounts based on the setting data D stored in the storage unit 12 and the current overall score stored in the user database DB1 (Step S209). In Step S209, the fraud detection server 10 identifies the feature amount set of the score range to which the overall score acquired in Step S205 belongs.

The fraud detection server 10 transmits, based on the feature amount database DB2, a request for acquiring a feature amount to the feature amount server 20 which creates the feature amount included in the feature amount set identified in Step S209 (Step S210). In Step S210, the fraud detection server 10 refers to the feature amount database DB2 and identifies the feature amount server 20 to which the request is to be transmitted. It is assumed that the request contains the type of the feature amount to be created. When some kind of information is required in order to create the feature amount, that information is also included in the request. When a plurality of feature amount servers 20 are required in order to acquire the feature amount set, the fraud detection server 10 transmits a request to each of the plurality of feature amount servers 20.

When the feature amount server 20 receives the request for acquiring the feature amounts (Step S211), the processing advances to FIG. 10. The feature amount server 20 creates the feature amount corresponding to the request, and transmits the created feature amount to the fraud detection server 10 (Step S212). In Step S212, when a plurality of feature amount servers 20 are required in order to create the feature amount set, each of the plurality of feature amount servers 20 creates the feature amounts in parallel.

When the fraud detection server 10 receives the feature amount (Step S213), the fraud detection server 10 determines whether or not fraud made by the user has been detected based on the received feature amount (Step S214). In Step S214, the fraud detection server 10 inputs the feature amount received in Step S213 to the learning model for fraud detection. The fraud detection server 10 acquires the result output from the learning model.

When it is determined that fraud made by the user has been detected (Step S214: Y), the fraud detection server 10 restricts the execution of the payment processing corresponding to the order confirmation request (Step S215), and this processing ends. Meanwhile, when it is not determined that fraud made by the user has been detected (Step S214: N), the fraud detection server 10 executes the payment processing corresponding to the order confirmation request (Step S216), and this processing ends.

According to the fraud detection system S of this embodiment, the period of time required for fraud detection can be shortened for the fraud detection system S as a whole by determining, based on an overall score of each of a plurality of users, an acquisition method for a feature amount of each user such that an acquisition time of the feature amount becomes shorter as a fraud level becomes lower. For example, for a user having a relatively low overall score, the feature amount acquisition time becomes shorter, and therefore the confirmation of the order by the user can be executed quickly. As a result, it becomes easier to satisfy the service level agreement, and user convenience is improved. Further, for this user, non-required feature amounts are not acquired, and therefore the processing load on each of the fraud detection server 10 and the feature amount server 20 can be reduced. Moreover, non-required feature amounts are not transmitted on the network N, and therefore the communication load can be reduced. For a user having a relatively higher overall score, the feature amount acquisition time becomes longer, and therefore more accurate fraud detection can be performed. As a result, the security of the fraud detection system S can be enhanced.

Further, the fraud detection system S can shorten the period of time required for fraud detection to match the actual situation of the fraud detection system S in consideration of the actual number of requests by setting the acquisition method based on the overall score of each of the plurality of users and the number of the requests from each of the plurality of users such that the acquisition time becomes shorter as the fraud level becomes lower and the acquisition time as a whole falls within a predetermined range. As a result, it is possible to more effectively reduce the processing load on each of the fraud detection server 10 and the feature amount server 20, reduce the communication load, and improve security.

Further, the fraud detection system S can more accurately consider the acquisition time of a feature amount and shorten the period of time required for fraud detection more reliably by determining the total acquisition time for each overall score and setting the setting data D based on the determined total acquisition time. As a result, it is possible to more effectively reduce the processing load on each of the fraud detection server 10 and the feature amount server 20, reduce the communication load, and improve security.

Further, the fraud detection system S can shorten the period of time required for fraud detection to match the actual situation of the fraud detection system S in consideration of the actual number of requests of the fraud detection system S by creating a distribution relating to a relationship between the overall score and the number of requests and performing setting based on the created distribution. As a result, it is possible to more effectively reduce the processing load on each of the fraud detection server 10 and the feature amount server 20, reduce the communication load, and improve security.

Further, by acquiring, based on each of a plurality of actions performed by each of a plurality of users, individual scores relating to the fraud level of each action performed by each user, and acquiring an overall score relating to the overall fraud level of each user based on the individual scores of each of the plurality of users, the fraud detection system S can use the overall score, which is a simpler index, to quickly determine a feature amount acquisition method.

Further, the fraud detection system S can acquire only the required types of feature amounts by determining the type of feature amount for each of a plurality of users such that the acquisition time becomes shorter as the fraud level becomes lower. As a result, it is possible to more effectively shorten the period of time required for fraud detection, reduce the processing load on each of the fraud detection server 10 and the feature amount server 20, reduce the communication load, and improve security.

Further, when order confirmation is performed at a fraud detection point after an action, for example, use registration, performed by each of the plurality of users, the fraud detection system S can shorten the period of time required for fraud detection at the fraud detection point by detecting fraud made by the users based on the feature amounts of the users. As a result, it is possible to prevent order confirmation from taking time to cause a deterioration in user convenience.

Further, in the fraud detection system S, through restriction of execution of the payment by, among the plurality of users, a user for which fraud has been detected, execution of a fraudulent payment can be prevented and the security of the fraud detection system S can be improved.

5. Modification Examples

This disclosure is not limited to the embodiment described above, and can be modified suitably without departing from the spirit of this disclosure.

(1) For example, the score acquisition unit 103 may acquire the overall score of each of the plurality of users based on a decision tree in which the individual scores of each of the plurality of users are variables. The decision tree includes conditional branches for determining the overall score from the plurality of individual scores. For example, each node in the decision tree corresponds to a variable, and the branches to the child nodes indicate the values that can be taken by the variable. Various known decision trees can be used as the decision tree itself. For example, a decision tree learning algorithm, for example, Iterative Dichotomiser 3 (ID3) or Classification and Regression Trees (CART), may be used.

Figure 11:
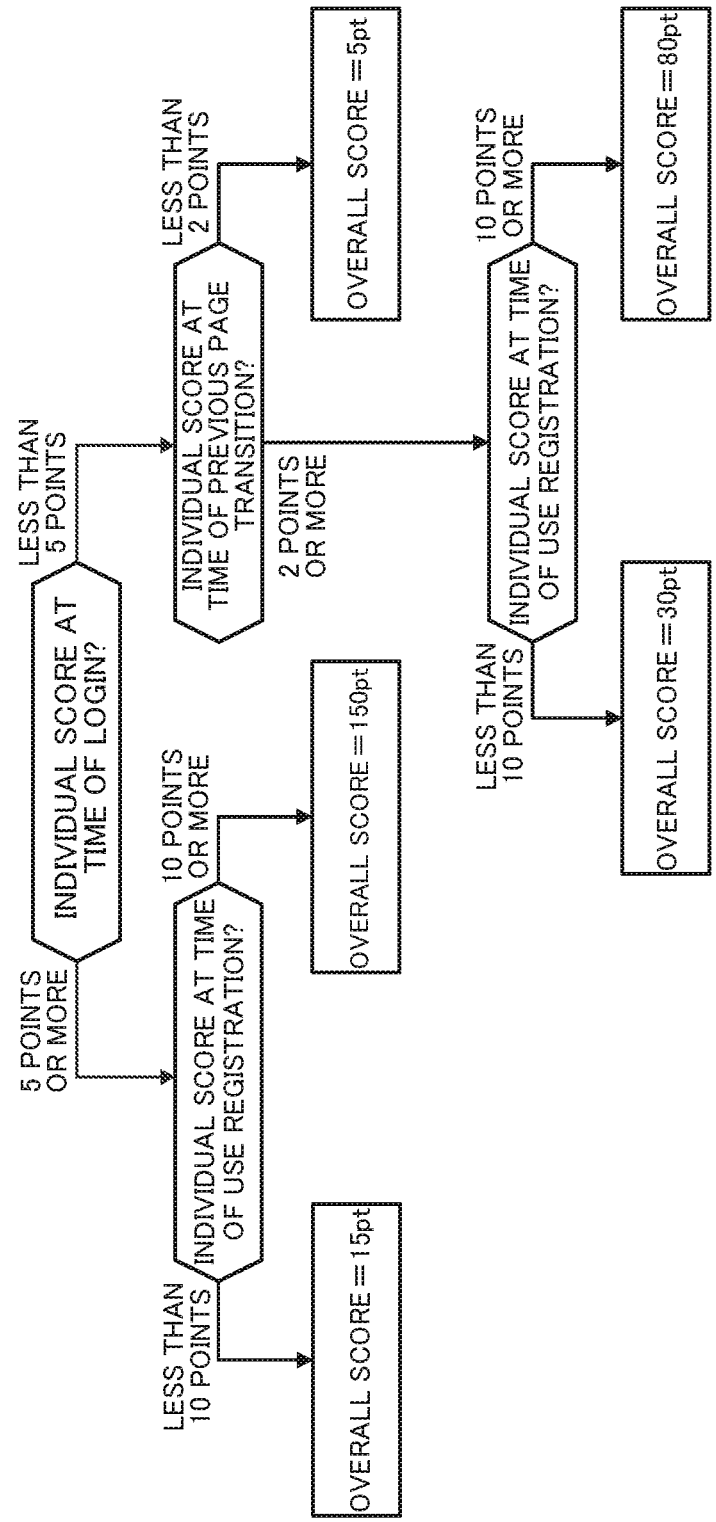
FIG. 11 is a diagram for illustrating an example of a decision tree in Modification Example (1) of this disclosure.

FIG. 11 is a diagram for illustrating an example of a decision tree in Modification Example (1) of this disclosure. In FIG. 11, the nodes of the decision tree are indicated by diamonds. The score acquisition unit 103 determines, by using the individual scores as variables, which branch to proceed to in order from the highest node. In the example of FIG. 11, when the individual score acquired at the time of login is 5 points or more, the score acquisition unit 103 proceeds to the node of the individual score at the time of use registration, and when the individual score acquired at the time of login is less than 5 points, the score acquisition unit 103 proceeds to the node of the individual score at the time of the previous page transition.

The value of the overall score is defined in the bottom layer of the decision tree. The score acquisition unit 103 determines the condition of each node up to the bottom layer of the decision tree. The score acquisition unit 103 proceeds along the nodes of the decision tree based on a plurality of individual scores of a certain user. When the score acquisition unit 103 reaches the bottom layer of the decision tree, the score acquisition unit 103 acquires the overall score indicated by the bottom layer. The processing after the overall score is acquired is as described in the embodiment. The decision tree is not limited to the example of FIG. 11, as long as the individual scores are defined as the variables.

According to Modification Example (1), through acquisition of the overall score of each of the plurality of users based on a decision tree in which the individual scores of each of the plurality of users are used as variables, the processing of acquiring the overall score is simplified and the overall score can be acquired more quickly. As a result, the processing load on the fraud detection server 10 can be reduced.

(2) Further, for example, when the feature amounts are created simultaneously in parallel, the feature amount acquisition unit 105 may acquire a feature amount of a type determined for each of the plurality of users and a feature amount of a type having a shorter acquisition time than the determined type. In the data storage example of FIG. 6, the feature amount acquisition unit 105 may acquire, as the feature amount set of the high score range H, all the types of feature amounts having an acquisition time of "500 ms" or less. Similarly, the feature amount acquisition unit 105 may acquire, as the feature amount set of the medium score range M or the low score range L, all the types of feature amounts having an acquisition time of "100 ms" or less or "50 ms" or less. Moreover, in place of acquiring all the types of feature amounts, a part of the types of feature amounts having a short acquisition time may be acquired.

According to Modification Example (2) of this disclosure, through acquisition of the feature amount of the type determined for each of the plurality of users and the feature amount of a type having a shorter acquisition time than the determined type, more feature amounts can be acquired within a limited acquisition time, and the accuracy of fraud detection can be improved.

(3) Further, for example, the determination unit 104 may determine the acquisition method for each of the plurality of users such that the feature amount which is important in the fraud detection is acquired and the acquisition time becomes shorter as the fraud level becomes lower. The importance of the feature amount is the influence that the feature amount has on the determination of the fraud detection. When the feature amount is more important, it is more likely that the fraud detection determination result changes when the value of the feature amount changes. In this modification example, it is assumed that an importance index, which is an index indicating the importance of the feature amount, is defined in the feature amount database DB2.

FIG. 12 is a table for showing a data storage example of the feature amount database DB2 in Modification Example (3) of this disclosure. As shown in FIG. 12, the feature amount database DB2 shows the importance index of each of a plurality of types of feature amounts. Various known methods can be used as the method of obtaining the importance index. For example, an importance index measured by using Permutation Importance may be used. Further, for example, the importance index may be specified by the administrator.

For example, there is now described a case in which "$f\_i$" represents the feature amount, "$I\_i$" represents the importance index of the feature amount $f\_i$, "$t\_i$" ($t\_1 < t\_2 < \ldots < t\_N$) represents the acquisition time required to acquire the feature amount $f\_i$, "i" represents a numerical value for identifying the feature amount to be acquired, and "N" represents a numerical value for identifying the maximum acquisition time. In this modification example, an acquisition efficiency $R(S\_i)$ of the feature amounts of the feature amount set $S\_i$ including the first feature amount $f\_1$ to the i-th feature amount $f\_i$ is calculated by the calculation formula "$(I\_1 + \ldots + I\_i)/t\_i$".

The feature amount set $S\_i$ which satisfies the service level agreement and optimizes the average value of the acquisition efficiency $R(S\_i)$ may be set for each overall score. The determination unit 104 determines the feature amount set $S\_i$ determined in this way as an acquisition target. Through consideration of the calculation efficiency $R(S\_i)$, the calculation efficiency of the feature amounts can be maximized.

The setting method considering the importance of the feature amount is not limited to the example described above. For example, as many feature amounts as possible may be selected in descending order of the importance index shown in FIG. 12 in the range fitting within the maximum acquisition time, and may be shown in the setting data D as the feature amount set.

According to Modification Example (3), through determination of the acquisition method for each of the plurality of users such that the feature amount important in the fraud detection is acquired and the acquisition time becomes shorter as the fraud level becomes lower, the accuracy of the fraud detection can be ensured while the period of time required for the fraud detection is shortened.

(4) Further, for example, the acquisition method determined by the determination unit 104 is not limited to the example of the embodiment. The determination unit 104 may determine a time limit permitted for the acquisition of the feature amount as the acquisition method in place of determining the type of the feature amount to be acquired. As in the embodiment, a plurality of types of feature amounts may be created in parallel, but in this modification example, it is assumed that a plurality of types of feature amounts are created in a predetermined order.

The time limit can also be said to be a cut-off time for acquiring the feature amounts. The determination unit 104 determines the time limit of each of the plurality of users such that the time limit becomes shorter as the fraud level becomes lower. The feature amount acquisition unit 105 acquires the feature amount of each of the plurality of users based on the time limit of each of the plurality of users. The feature amount acquisition unit 105 acquires only the feature amounts that have been created within the time limit. Feature amounts created after that are not acquired.

In this modification example as well, as in the embodiment, a part of the types of feature amounts may be acquired, and of the part of the types of feature amounts, the detection unit 106 may execute fraud detection through use of only the feature amounts acquired within the time limit. Further, all of the types of feature amounts may be acquired, and among all of the types of feature amounts, the detection unit 106 may execute fraud detection through use of only the feature amounts acquired within the time limit.

According to Modification Example (4) of this disclosure, the period of time required for fraud detection can be shortened by determining the time limit of each of the plurality of users such that the time limit becomes shorter as the fraud level becomes lower. As a result, the effect that the processing load, for example, on the fraud detection server 10 and the feature amount server 20 can be reduced is as described in the embodiment. In addition, through setting of the time limit, the service level agreement can be satisfied more certainly.

(5) Further, for example, the above-mentioned modification examples may be combined.

Further, for example, when the administrator specifies the feature amount set, the administrator may specify the feature amount set such that an important feature amount is included in the feature amount set, but when the fraud detection server 10 automatically selects the feature amounts, the number of feature amounts may be very low or the important feature amount may not be selected. In this case, the accuracy of the fraud detection may not be guaranteed. In particular, in a case in which a learning model common to a plurality of feature amount sets is used as a learning model for fraud detection and insufficient feature amounts are deleted, when the number of input feature amounts is small, the number of deleted values increases, and the accuracy of the fraud detection may not be guaranteed.

In view of this, the fraud detection server 10 may evaluate in advance the accuracy of fraud detection to be obtained when each of the plurality of feature amount sets is input to the learning model. The fraud detection server 10 identifies at least one of the type and the number of the feature amounts at least required to ensure a predetermined accuracy, and select the feature amount set so as to include the identified at least one of the type and number of the feature amounts. Further, the important feature amount may change depending on the situation, and therefore the processing of evaluating the feature amounts required to ensure the accuracy of the fraud detection may be repeated every predetermined period (for example, one month). Moreover, for example, the administrator may specify all the contents of the setting data D without totaling the number of requests.

Further, for example, although the main functions are implemented in the fraud detection server 10 in the case described above, the functions may be distributed among a plurality of computers. For example, the functions may be distributed among the fraud detection server 10, the feature amount server 20, and the user terminal 30. When the fraud detection system S includes a plurality of server computers, for example, the functions may be distributed among the plurality of server computers. The data stored in the data storage unit 100 in the description given above, for example, may be stored in a computer other than the fraud detection server 10.

The invention claimed is:

1. A fraud detection system, comprising:
a fraud detection server comprising at least one processor configured to:
  acquire information that indicates actions performed by each of a plurality of users of a service provided over the internet;
  acquire, based on an action performed by each of the plurality of users of the service, a score relating to a fraud level of the each of the plurality of users;
    wherein the action and the score correspond to actions conducted by the plurality of users on the service provided over the internet;
    wherein the actions each include an action content comprising an action type, an IP address, an access location, an access date and time, a URL of an accessed page, and a user operation content;
    wherein the action type comprises a user registration, a login, or a page transition;
    wherein the IP address is the IP address of a user terminal used for the action;
    wherein the access location is the location of a user or the user terminal;
  determine, based on the score of each of the plurality of users, an acquisition method for a feature amount of the each of the plurality of users such that an acquisition time of the feature amount becomes shorter as the fraud level becomes lower;
    wherein the feature amount is information on a feature for each of the plurality of users and is related to actions by each of the plurality of users on the service provided over the internet;
  acquire the feature amount of each of the plurality of users based on the acquisition method determined for the each of the plurality of users;
  detect, in real time, fraud made by each of the plurality of users based on the feature amount of the each of the plurality of users;
    wherein the at least one processor is configured to acquire a plurality of types of feature amounts,
    wherein the acquisition method is the type of the feature amount to be acquired,
    wherein the at least one processor is configured to determine the type of the feature amount for each of the plurality of users such that the acquisition time becomes shorter as the fraud level becomes lower,
    wherein the at least one processor is configured to acquire the feature amount of the type determined for each of the plurality of users;
    wherein each of the plurality of types of feature amounts is acquirable in parallel with each other,
    wherein the at least one processor is configured to acquire the feature amount of the type determined for each of the plurality of users and the feature amount of a type having a shorter acquisition time than the acquisition time of the determined type;
  restrict a processing requested by the user based on the detection;
  receive a request from each of the plurality of users,
  set the acquisition method based on the score of each of the plurality of users and a number of requests from each of the plurality of users such that the acquisition time becomes shorter as the fraud level becomes lower and the acquisition time as a whole falls within a predetermined range, and
  determine the acquisition method for each of the plurality of users based on the score of the each of the plurality of users and the set acquisition method.

2. The fraud detection system according to claim 1, wherein the at least one processor is configured to determine a length relating to the acquisition time for each of the scores, and to set the acquisition method based on the determined length.

3. The fraud detection system according to claim 1, wherein the at least one processor is configured to create a distribution relating to a relationship between the score and the number of requests, and to set the acquisition method based on the created distribution.

4. The fraud detection system according to claim 1, wherein the at least one processor is configured to:
  acquire, based on each of a plurality of actions performed by each of the plurality of users, an individual score relating to the fraud level of the each of the plurality of actions performed by the each of the plurality of users,
  acquire, based on the individual scores of each of the plurality of users, an overall score relating to an overall fraud level of the each of the plurality of users, and
  determine the acquisition method for each of the plurality of users such that the acquisition time becomes shorter as the fraud level of the overall score becomes lower.

5. The fraud detection system according to claim 4, wherein the at least one processor is configured to acquire the overall score of each of the plurality of users further based on a decision tree in which each of the individual scores of the each of the plurality of users is a variable.

6. The fraud detection system according to claim 1, wherein the at least one processor is configured to determine the acquisition method for each of the plurality of users such that the feature amount important in fraud detection is acquired and the acquisition time becomes shorter as the fraud level becomes lower.

7. The fraud detection system according to claim 1,
wherein the at least one processor is configured to acquire the score of each of the plurality of users based on a first action performed by the each of the plurality of users, and
wherein the at least one processor is configured to detect fraud made by each of the plurality of users based on the feature amount of the each of the plurality of users when a second action after the first action is performed by the each of the plurality of users.

8. The fraud detection system according to claim 7,
wherein the first action is an action up to a request for payment,
wherein the second action is the request for the payment, and
wherein the at least one processor restricts execution of the payment by, among the plurality of users, a user for which fraud has been detected.

9. A fraud detection system, comprising:
a fraud detection server comprising at least one processor configured to:
  acquire information that indicates actions performed by each of a plurality of users of a service provided over the internet;
  acquire, based on an action performed by each of the plurality of users of the service, a score relating to a fraud level of the each of the plurality of users;
    wherein the action and the score correspond to actions conducted by the plurality of users on the service provided over the internet;
    wherein the actions each include an action content comprising an action type, an IP address, an access location, an access date and time, a URL of an accessed page, and a user operation content;
    wherein the action type comprises a user registration, a login, or a page transition;
    wherein the IP address is the IP address of a user terminal used for the action;
    wherein the access location is the location of a user or the user terminal;
  determine, based on the score of each of the plurality of users, an acquisition method for a feature amount of the each of the plurality of users such that an acquisition time of the feature amount becomes shorter as the fraud level becomes lower;
    wherein the feature amount is information on a feature for each of the plurality of users and is related to actions by each of the plurality of users on the service provided over the internet;
  acquire the feature amount of each of the plurality of users based on the acquisition method determined for the each of the plurality of users;
  detect, in real time, fraud made by each of the plurality of users based on the feature amount of the each of the plurality of users;
  wherein the at least one processor is configured to acquire the plurality of types of feature amounts,
  wherein the acquisition method is a time limit within which the feature amount is permitted to be acquired,
  wherein the at least one processor is configured to determine the time limit for each of the plurality of users such that the time limit becomes shorter as the fraud level becomes lower,
  wherein the at least one processor is configured to acquire the feature amount of each of the plurality of users based on the time limit determined for the each of the plurality of users;
  restrict a processing requested by the user based on the detection;
  receive a request from each of the plurality of users,
  set the acquisition method based on the score of each of the plurality of users and a number of requests from each of the plurality of users such that the acquisition time becomes shorter as the fraud level becomes lower and the acquisition time as a whole falls within a predetermined range, and
  determine the acquisition method for each of the plurality of users based on the score of the each of the plurality of users and the set acquisition method.

10. A fraud detection system, comprising:
a fraud detection server comprising at least one processor configured to:
  acquire information that indicates actions performed by each of a plurality of users of a service provided over the internet;
  acquire, based on an action performed by each of the plurality of users of the service, a score relating to a fraud level of the each of the plurality of users;
    wherein the action and the score correspond to actions conducted by the plurality of users on the service provided over the internet;
    wherein the actions each include an action content comprising an action type, an IP address, an access location, an access date and time, a URL of an accessed page, and a user operation content;
    wherein the action type comprises a user registration, a login, or a page transition;
    wherein the IP address is the IP address of a user terminal used for the action;
    wherein the access location is the location of a user or the user terminal;
  determine, based on the score of each of the plurality of users, an acquisition method for a feature amount of the each of the plurality of users such that an acquisition time of the feature amount becomes shorter as the fraud level becomes lower;
    wherein the feature amount is information on a feature for each of the plurality of users and is related to actions by each of the plurality of users on the service provided over the internet;
  acquire the feature amount of each of the plurality of users based on the acquisition method determined for the each of the plurality of users;
  detect, in real time, fraud made by each of the plurality of users based on the feature amount of the each of the plurality of users;
a first machine learning model configured to acquire an individual score of a first user;
  wherein the first machine learning model is trained with first training data in which a feature amount of each action by the first user is an input and the individual score is an output;
a second machine learning model configured to acquire an overall score;
  wherein the second machine learning model is trained with second training data in which a plurality of individual scores of a second user are inputs and information indicating whether or not the second user is fraudulent is the output;
a third machine learning model configured to detect fraud wherein a feature amount of a third user is input into the third machine learning model;
  restrict a processing requested by the user based on the detection;

receive a request from each of the plurality of users,
set the acquisition method based on the score of each of the plurality of users and a number of requests from each of the plurality of users such that the acquisition time becomes shorter as the fraud level becomes lower and the acquisition time as a whole falls within a predetermined range, and
determine the acquisition method for each of the plurality of users based on the score of the each of the plurality of users and the set acquisition method.

* * * * *